(12) United States Patent
Hirzel et al.

(10) Patent No.: US 7,180,216 B2
(45) Date of Patent: Feb. 20, 2007

(54) HIGH-INTENSITY DISCHARGE LIGHTING SYSTEM AND ALTERNATOR POWER SUPPLY

(75) Inventors: Andrew D. Hirzel, Kalamazoo, MI (US); David R. Crecelius, Noblesville, IN (US)

(73) Assignee: Light Engineering, Inc., Indianapolis, IN (US)

( * ) Notice: Subject to any disclaimer, the term of this patent is extended or adjusted under 35 U.S.C. 154(b) by 134 days.

(21) Appl. No.: 11/016,092

(22) Filed: Dec. 18, 2004

(65) Prior Publication Data

US 2006/0131978 A1 Jun. 22, 2006

(51) Int. Cl.
*H02K 17/42* (2006.01)

(52) U.S. Cl. .................. 310/168; 310/179; 310/216

(58) Field of Classification Search ............... 310/168, 310/179, 203, 208, 216–218, 259; 322/1, 322/22; 315/78, 160
See application file for complete search history.

(56) References Cited

U.S. PATENT DOCUMENTS

| | | | | |
|---|---|---|---|---|
| 5,650,680 | A | | 7/1997 | Chula .................... 310/156 |
| 5,808,450 | A | | 9/1998 | Chula et al. ............ 322/22 |
| 6,094,011 | A | * | 7/2000 | Notsu .................... 315/78 |
| 6,239,552 | B1 | * | 5/2001 | Notsu .................... 315/78 |
| 6,420,813 | B1 | * | 7/2002 | DeCristofaro et al. ...... 310/216 |
| 6,462,456 | B1 | * | 10/2002 | DeCristofaro et al. ...... 310/216 |
| 6,803,694 | B2 | * | 10/2004 | Decristofaro et al. ....... 310/216 |
| 7,067,950 | B2 | * | 6/2006 | Hirzel et al. ............... 310/216 |
| 2005/0040728 | A1 | * | 2/2005 | Hirzel .................... 310/268 |
| 2005/0093393 | A1 | * | 5/2005 | Hirzel .................... 310/268 |

* cited by examiner

*Primary Examiner*—Thanh Lam
(74) *Attorney, Agent, or Firm*—Ernest D. Buff & Associates, LLC; Ernest D. Buff; Gordon E. Fish

(57) ABSTRACT

A high intensity lighting system comprises a plurality of high intensity discharge lamps electrically connected to a polyphase alternator and a prime mover mechanically connected to the alternator. An inherent impedance characteristic of the alternator permits the lamps to be reliably started and energized without any separate ballast or comparable impedance element. The alternator comprises a stator having teeth extending from a backiron. The teeth consist of the alternator phases, and the coils encircle the respective teeth of each pair and are wound in opposite sense and connected in series. The machine is preferably an axial airgap device wherein the stator assembly has a magnetic core made from low loss, high frequency material. A high pole count permits the electrical device to operate at high commutating frequencies, with high efficiency, high power density and improved performance characteristics. Low-loss materials incorporated by the device include amorphous metals, nanocrystalline metals, optimized Si—Fe alloys, grain-oriented Fe-based materials or non-grain-oriented Fe-based materials.

38 Claims, 11 Drawing Sheets w = slot width
D = stator outer diameter
d = stator inner diameter

T = tooth height
H = overall height

HIGH-INTENSITY DISCHARGE LIGHTING SYSTEM AND ALTERNATOR POWER SUPPLY

BACKGROUND OF THE INVENTION

1. Field of the Invention

The invention relates to a lighting system; and more particularly, to a high intensity discharge lighting system powered by a polyphase axial airgap alternator wherein the phases are substantially non-interacting magnetically.

2. Description of the Prior Art

High intensity lighting systems are in widespread use in commercial and industrial applications, such as the illumination of public venues, both indoor and outdoor, including stadiums, arenas, roadways, parking lots, and the like. These systems are used both in permanent, fixed installations and as part of a mobile arrangement employed for nighttime construction and in emergency or disaster conditions, for example.

Many of these systems employ high intensity discharge (HID) lamps. Known classes of HID lamps include low pressure mercury and sodium vapor, high pressure sodium vapor, and metal halide discharge lamps. Typically the lamp has a transparent glass or preferably a quartz envelope filled at least with inert gas and metal or metal halide material. The lamp includes at least two electrodes connected to a source of electric energy, which ordinarily is supplied either from the electric utility grid or by an alternator mechanically powered by a prime mover, such as an internal combustion or gas turbine engine. In some specialized applications, other energy sources, such as batteries, fuel cells, or the like, may be used.

All of these HID lamp classes share a basic principle of operation, in which an electric discharge is created and sustained between electrically energized electrodes. Different ones of these classes have different numbers of electrodes and different electrode configurations. However, generally stated, all of these HID lamps are started by connecting two or more electrodes to an electrical source. Free electrons and ionized gas are produced within the lamp envelope, by processes that may include one or more of thermionic or cold cathode emission of electrons, or direct dielectric breakdown of the gas. Once a sufficient density of charged species is present, the electric field between the electrodes causes a current flow to be established. Atomic collision processes excite the electrons in some of the atoms in the lamp into non-equilibrium energy states, which subsequently decay with the emission of light, which may include visible and ultraviolet wavelengths. Depending on the type of lamp and the operating conditions, the light may be predominantly in one or more discrete spectral lines or may span a continuum of wavelengths.

Most commonly, HID lamps are started by imposing a starting voltage sufficient to cause an electric arc to be struck across electrodes by dielectric breakdown. After current initially begins to flow, the lamp enters an operating regime that exhibits a negative resistance portion. That is to say, the lamp has a current-voltage characteristic that includes an operating region in which an increase in current results in a decrease in voltage drop across the lamp. By way of contrast, an ordinary conductor solely exhibits positive resistance, so that an increase in current corresponds inexorably to an increase in voltage drop. It is believed that the negative resistance phenomenon is a consequence of increased conductivity that results from an increase in the density of electrons and ions in the gas plasma. As a consequence, an HID lamp circuit is virtually never designed with a constant voltage supply. A potential sufficient to initiate the arc and start the lamp would be highly likely to result in a runaway behavior, in which the lamp would start, then experience an excessive increase in current that would markedly shorten lamp life. Instead, the lamp is ordinarily connected to an AC voltage source through a ballast providing significant inductive impedance. For example, a metal halide HID lamp of the type commonly used in a mobile light tower has a rated steady state output of about 1 kW. The lamp has a recommended starting potential of about 450 V, but a steady-state operation at about 240 V. Although a ballast having but a simple inductor suffices for some HID lamps, more often a combination of inductors and capacitors is used.

A further function of the ballast is to sustain the arc through the zero voltage crossing of the AC supply voltage. Near the zero crossing, the electric field in the lamp is insufficient to sustain the discharge. Thermalization and recombination processes in the plasma result in a decay with time of the number of charged species available for conduction. If the conductivity drops too much while the voltage is near zero, the lamp is extinguished and the arc must be re-established. Excessive cycling is known to decrease lamp life. Two approaches have been proposed to prevent extinguishment. If the ballast has sufficient inductance, the phase shift between the current and voltage and the inherent non-linearity of the lamp are together sufficient to increase the slope of the voltage waveform at the zero crossing. The time spent below the threshold is thus too short for the plasma to decay enough to extinguish the discharge. In other cases, a higher supply frequency is used as a means to increase voltage slope at the zero crossing.

However, both these approaches have undesirable consequences. A ballast with sufficient inductance to function at typical line frequencies of 50–60 Hz is massive and expensive. Ballasts also produce significant core losses, especially if constructed with conventional soft magnetic materials. The detrimental effect of core losses on overall device efficiency is particularly significant in devices operating above line frequency, requiring specific measures to ensure that the substantial waste heat is properly dissipated.

One common application of HID lamp systems is in a mobile light tower, such as that disclosed by U.S. Pat. No. 5,808,450 (hereinafter "the 450 patent"), which is incorporated herein in the entirety by reference thereto. The '450 patent provides a mobile light tower that includes a frame structure, a lighting assembly mounted on the frame structure, and a source of AC electric power. Commonly the tower system is configured as a wheeled trailer that can be towed by a vehicle to a desired location. The lighting assembly comprises a plurality of HID lamps, often four lamps mounted on a retractable, telescoping boom. In its closed position, the boom is relatively compact, permitting the system to be towed conveniently. During operation, the boom is vertically extended and erected, permitting the lamps to illuminate a relatively wide area. A suitable electric power source for the '450 system is said to be a diesel engine driving a synchronous alternator. Other ancillary equipment, including a fuel tank, a starter battery for the diesel engine, and electrical controls are included in the system. Such a system has a number of uses, notably including the illumination of a nighttime construction site. One embodiment of a mobile light tower provided by the '450 patent is depicted by FIG. 1. Light tower 110 has a mobile frame structure 112, such as a trailer having wheels 114 and a hitch 116. Tower 110 has a lighting assembly 118 mounted on the frame structure 112. The lighting assembly 118 has a retractable, telescoping boom. The lower end of the boom 120 is pivotally mounted to the frame structure 112 which a locking hinge 122. A set of four lamps 124, preferably metal halide lamps, are mounted to the far end of the retractable telescoping boom 120 opposite the hinge 122. A source of electric AC power, comprising a prime mover driving a synchronous alternator assembly, is mounted on the mobile frame structure 112 within an alternator assembly housing 126. Electrical AC power provided from the power source energizes lamps 124 through electrical power lines 128. The illustrated mobile light tower 110 has three jacks 130 to support the frame structure 112 in a stationary position. To set up the mobile light tower 110 in preparation of operation of the set of lamps 124, the mobile light tower 110 is towed to a position where it is desirable to set up the light tower 110, and the jacks 130 are engaged. Then, a hand crank 132 is used to pull the boom 120 from a retracted position to an upright position as depicted in FIG. 1. The height of the lamps 124 can be adjusted by adjusting an inner telescoping boom member 134 within an outer telescoping boom member 136. A horizontal light support member 40 is mounted to the top of the inner telescoping boom member 134. The lamps 124 are adjustably attached to a horizontal support member.

However, there are known deficiencies in present mobile light towers, including that provided by the '450 patent. Most common alternators are designed to have a low source impedance and operate at a low frequency, such as 60 Hz. To power HID lamps with a low frequency, low impedance alternator, an intervening ballast must be used to accommodate the highly non-linear electrical characteristics of HID lamps, as discussed hereinabove. The ballast typically must provide at least three functions: (i) increasing the voltage at lamp start-up to a level sufficient to strike the required arc; (ii) limiting current flow during steady-state lamp operation to prevent runaway; and (iii) increasing the slope of the AC voltage waveform through the zero-crossing point of the current waveform to prevent lamp self-extinguishment. Such a ballast adds substantially to the weight, volume, and expense of the system.

Another problem arises with HID light systems wherein a conventional polyphase alternator is connected such that each HID lamp is supplied by one of the alternator phases. Such a multi-lamp system often experiences significant difficulties during the initial startup, attributable to detrimental magnetic interactions between the alternator phases. Frequently, a first one or more of the lamps starts satisfactorily, but parasitic flux paths cause later-to-fire phases to lack sufficient voltage to strike the initial arc in the respective lamp for some appreciable time. Such interactions markedly impair the flexibility of such systems, which cannot be fully and reliably started without a long wait time or the provision of compensating circuitry that considerably complicates the lighting system.

The '450 patent discloses avoidance of the foregoing interaction problem by providing a power source comprising a separate alternator to power each HID lamp. Furthermore, each alternator in the alternative system provided by the '450 patent is said to have internal impedance characteristics that permit it to drive an HID lamp without any external ballasts. The use of separate alternator units disposed on a common shaft obviates the interaction problem, but at the cost of a lighting system that is larger and more expensive and complicated to construct and operate. The '450 alternator system also is said to operate at a relatively high frequency, such as 200–600 Hz, to minimize the risk of self-extinguishment. However, dynamoelectric machines employing conventional soft magnetic material in their stators and operated at commutating frequencies above line frequency are known to experience significant core losses. As a result, they frequently must be equipped with substantial cooling means or be designed to operate at a lower working flux density. These features either reduce efficiency or increase overall device size and weight.

Rotating machines, including the present alternator, ordinarily comprise a stationary component known as a stator and a rotating component known as a rotor. Adjacent faces of the rotor and stator are separated by a small airgap traversed by magnetic flux linking the rotor and stator. It will be understood by those skilled in the art that a rotating machine may comprise plural, mechanically connected rotors and plural stators. Virtually all rotating machines are conventionally classifiable as being either radial or axial airgap types. A radial airgap type is one in which the rotor and stator are separated radially and the traversing magnetic flux is directed predominantly perpendicular to the axis of rotation of the rotor. In an axial airgap device, the rotor and stator are axially separated and the flux traversal is predominantly parallel to the rotational axis.

Except for certain specialized types, motors and generators generally employ soft magnetic materials of one or more types. By "soft magnetic material" is meant one that is easily and efficiently magnetized and demagnetized. The energy that is inevitably dissipated in a magnetic material during each magnetization cycle is termed hysteresis loss or core loss. The magnitude of hysteresis loss is a function both of the excitation amplitude and frequency. A soft magnetic material further exhibits high permeability and low magnetic coercivity. Motors and generators also include a source of magnetomotive force, which can be provided either by one or more permanent magnets or by additional soft magnetic material encircled by current-carrying windings. By "permanent magnet material," also called "hard magnetic material," is meant a magnetic material that has a high magnetic coercivity and strongly retains its magnetization and resists being demagnetized. Depending on the type of machine, the permanent and soft magnetic materials may be disposed either on the rotor or stator.

By far, the preponderance of dynamoelectric machines currently produced use as soft magnetic material various grades of electrical or motor steels, which are alloys of Fe with one or more alloying elements, especially including Si, P, C, and Al. Most commonly, Si is a predominant alloying element. While it is generally believed that motors and generators having rotors constructed with advanced permanent magnet material and stators having cores made with advanced, low-loss soft materials, such as amorphous metal, have the potential to provide substantially higher efficiencies and power densities compared to conventional radial airgap motors and generators, there has been little success in building such machines of either axial or radial airgap type. Previous attempts at incorporating amorphous material into conventional radial or axial airgap machines have been largely unsuccessful commercially. Early designs mainly involved substituting the stator and/or rotor with coils or circular laminations of amorphous metal, typically cut with teeth through the internal or external surface. Amorphous metal has unique magnetic and mechanical properties that make it difficult or impossible to directly substitute for ordinary steels in conventionally designed machines.

High speed electric machines are almost always manufactured with low pole counts, lest the magnetic materials in electric machines operating at higher frequencies experience excessive core losses that contribute to inefficient machine design. This is mainly due to the fact that the soft material used in the vast majority of present machines is a silicon-iron alloy (Si—Fe). It is well known that losses resulting from changing a magnetic field at frequencies greater than about 400 Hz in conventional Si—Fe-based materials causes the material to heat undesirably, oftentimes to a point where the device cannot be cooled by any acceptable means.

Accordingly, there remains a need in the art for lighting systems that are highly compact, efficient and reliable. Especially desired are self-contained systems employing alternators that take full advantage of the specific characteristics associated with low-loss material, thus eliminating many of the disadvantages associated with conventional machines. Ideally, an improved mobile lighting system would provide higher efficiency of conversion between mechanical and electrical energy forms and operate for an extended period on a minimal fuel charge. Improved efficiency in generating machines powered by fossil fuels would concomitantly reduce air pollution.

SUMMARY OF THE INVENTION

In an aspect, the present invention provides a high intensity lighting system, comprising a plurality of high intensity discharge lamps electrically connected to a polyphase alternator and a prime mover mechanically connected to the alternator. The alternator comprises: (i) at least one stator assembly comprising: a stator core comprising a plurality of tooth sections extending from a backiron section; and a plurality of stator phase windings, each phase winding comprising a plurality of connected coils, each coil encircling one of the tooth sections; and (ii) at least one rotor assembly supported for rotation about an axis and including a plurality of poles, the rotor assembly being arranged and disposed for magnetic interaction with the at least one stator assembly. The said tooth sections of the stator core consist of pairs of circumferentially adjacent teeth, an equal number of the pairs being associated with each of the alternator phases. The coils encircling the respective teeth of each pair are wound in opposite sense and connected in series. Preferably, the alternator is an axial airgap machine.

The lighting system is preferably formed as a mobile unit mounted on a wheeled frame, permitting it to be towed to a desired remote location for illuminating an area. By a "remote location" is meant any area in which it is desired to provide illumination without the use of a connection to a power source external to the unit. Such a mobile lighting system is advantageously used to illuminate a nighttime construction site, for example.

In a further aspect, a polyphase alternator of the present lighting system is adapted to be connected directly to high energy discharge lamps, especially high power metal halide lamps, without need for a ballast or similar impedance element interposed between the alternator and the lamps. Stator phase windings for a plurality of phases are disposed on a stator core in the alternator. By a "stator phase winding" is mean a winding having one or more turns of wire encircling part of a stator structure of a dynamoelectric machine and adapted to be connected to an electric circuit associated with one of the phases of a polyphase machine. Phase windings ordinarily are comprised of plural turns of wire in multiple coils encircling stator teeth. As a result of the pair-wise disposition of the phase windings in the present alternator, the magnetic circuits associated with the different electrical phases of the alternator are substantially non-interacting, even under the extreme loading that occurs during lamp startup. The present alternator is thereby more compact than previous alternator systems used in HID lighting systems, which have required plural alternators disposed on a common shaft, while substantially avoiding the lamp startup difficulties attendant to previous alternator systems in which windings for plural phases are disposed on a common stator core.

The invention also provides, in another aspect, a method for setting the inductance of an electrical machine that comprises at least one stator assembly and at least one rotor assembly supported for rotation about an axis and including a plurality of poles, the rotor assembly being arranged and disposed for magnetic interaction with the at least one stator assembly. The stator assembly comprises a plurality of tooth sections extending from a backiron section and terminating in a free end opposite the backiron section; and at least one stator phase winding comprising a plurality of connected coils, each coil encircling one of the tooth sections and being disposed over a portion of that tooth section to a point of separation from the free end. The point of separation is selected to be sufficient to provide the machine with a preselected inductance. By way of contrast, conventionally designed machines employ a minimal separation between the extent of the stator coil windings and the free end of each stator tooth, whereby machine inductance is minimized. Although a minimum inductance is preferred for many applications, certain uses, such as the present high intensity discharge lighting system, benefit from some inductance, which otherwise must be supplied by one or more additional circuit elements, such as discrete inductors or ballasts.

The stator assembly of the present device preferably has a magnetic core made from low loss, high frequency material. More preferably, the stator's magnetic core is made of amorphous metals, nanocrystalline metals, optimized Si—Fe alloys, grain-oriented Fe-based materials or non-grain-oriented Fe-based materials. The introduction of amorphous metals, nanocrystalline metals, optimized Si—Fe alloys, grain-oriented Fe-based materials or non-grain-oriented Fe-based materials into electrical devices enables the device's frequency to be increased above 400 Hz with only a relatively small increase in core loss, as compared to the large increase exhibited in conventional machines, thus yielding a highly efficient electric device capable of providing increased power. The invention further provides a highly efficient electric device with a high pole count capable of providing increased power density in conjunction with possible high frequency operation. The use of frequencies higher than ordinary 50–60 Hz line frequency is especially useful in driving high intensity discharge lamps, because of the resulting increase in slope of the voltage waveform in the vicinity of the zero crossings each cycle.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DESCRIPTION OF THE PREFERRED EMBODIMENTS

Preferred embodiments of the present invention will be explained in greater detail hereinafter, with reference to the accompanying drawings.

Figure 1:
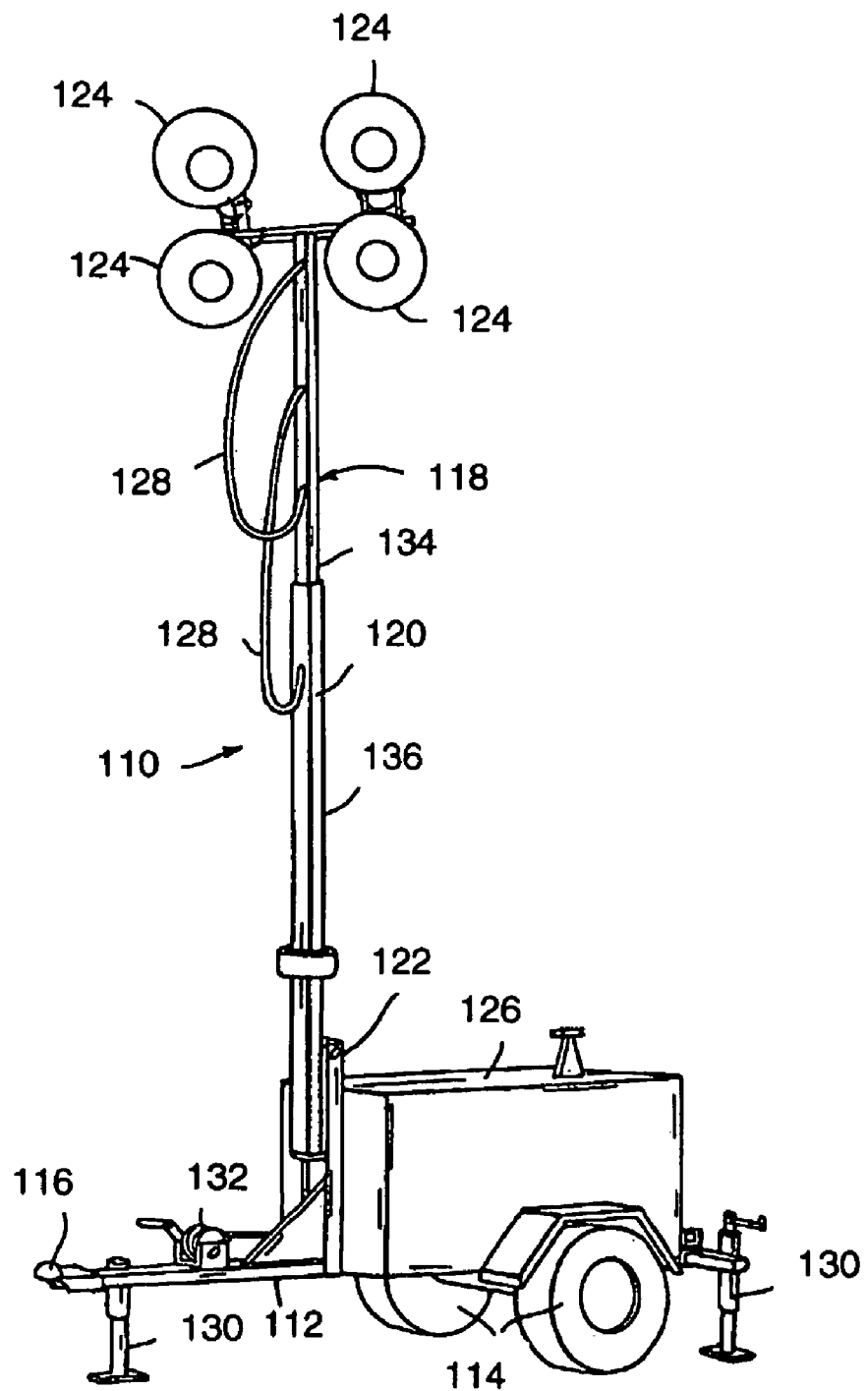
FIG. 1 is a perspective view depicting a mobile light tower of the prior art.
Figure 2:
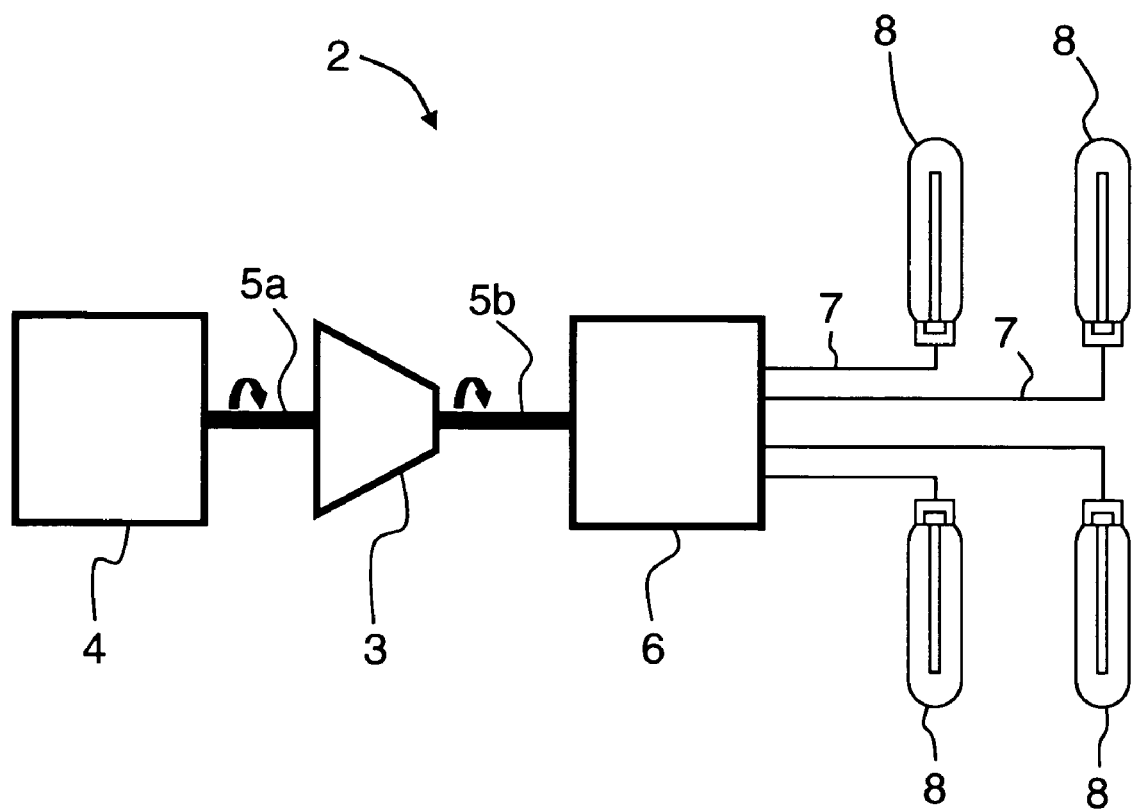
FIG. 2 is a schematic, block-diagram depicting a lighting system of the present invention.

In one aspect, the present invention involves the design and manufacture of a high intensity discharge lighting system powered by an alternator system having an impedance characteristic that permits lamp operation without the external ballasts conventionally required. Referring now to FIG. 2, there is shown a lighting system 2 of the invention, comprising a prime mover, such as diesel engine 4, that drives a rotating shaft having independent sections 5a, 5b linking engine 4 to alternator 6. Separate windings for each alternator phase are connected by wires 7 to high intensity discharge lamps 8. A speed matching device, such as gearbox 3, is optionally interposed between engine 4 and alternator 6. However, a preferred alternator is able to operate efficiently over a wide range of rotational speeds, so that the speed matching device, which adds size and complexity and invariably causes a loss of system efficiency, can be omitted. Of course, absent the gearbox, a single rotating shaft connects engine 4 and alternator 6. Other forms of fuel-powered, rotating, internal combustion and gas turbine engines are alternatively used. In still other embodiments prime power is provided by wind or water-driven turbines. Other forms of drive linkage, such as a belt driven system, may also be used.

In a preferred mobile light tower embodiment of system 2, the foregoing system components are mounted on a chassis having the form of a wheeled trailer that can be towed by a motor vehicle to a desired location. The lamps are attached to a boom that typically is stowable in a retracted and folded position for storage and transport of the system and erectable in a generally vertical position during use. The boom may comprise any combination of one or more articulated or telescoping sections. Any suitable mechanical system may be included to assist with elevating the boom, such as cable and winch systems, pneumatic or hydraulic systems, or the like. A preferred system incorporates a plurality of metal halide HID lamps rated at 1000 W, such as an array of four such lamps. The lamps are used in conjunction with a polyphase alternator, with one lamp being connected to each phase. By "polyphase alternator" is meant a dynamoelectric, rotating machine adapted to generate and supply AC electrical power in a plurality of independently connectable phase circuits. The periodic waveforms of current and voltage in the respective phases are substantially equally distributed over each periodic cycle. Preferably, the alternator is at least a three-phase device. More preferably, the alternator is a four phase device used to energize four independent HID lamps. Alternators are also sometimes known as generators. Other embodiments may employ an alternator with a different number of phases and a corresponding number of independent lamps that may have a variety of wattage ratings. Provision of other ancillary components, such as a fuel supply tank, an engine starting battery, and a control panel, permits a mobile light tower system to be self contained and usable for extended periods in field locations with minimal or no user intervention after setup. The normal operation of the system is optionally automated, e.g. being activated by an automatic timer or ambient light sensor.

In another aspect of the system there is provided a polyphase alternator having an output impedance characteristic that permits it to drive a plurality of high intensity discharge lamps without the external ballasts required for lamps energized by conventional prior art alternators. The alternator employs a stator assembly having a stator core on which are disposed stator windings associated with more than one phase, but in which the magnetic circuit for each phase is substantially free of magnetic interaction with the magnetic circuits of the one or more other phases wound on that stator core. Each phase winding is appointed to be connected preferably to a single HID lamp. Operation of such a polyphase alternator with a single lamp connected to each of its phases advantageously permits the lamps to operate reliably and independently. By way of contrast, it is frequently found to be difficult or impossible to reliably start all of the HID lamps in lighting systems energized by previous alternators having substantial inter-phase magnetic interaction. More specifically, when such a system is cold-started, the inevitable slight variation between the electrical characteristics of each alternator phase and the lamp connected thereto, frequently causes the lamps to be unlikely to fire simultaneously. As one or more of the lamps comes on-line into steady state operation, the current flow through these lamps deleteriously affects the magnetic circuits associated with the unlit lamps, often to the point that the alternator is unable to provide enough voltage to the still unlit lamps to allow their arcs to strike to initiate lamp turn-on and operation. Typically the difficulty increases as the lamps sequentially fire, with the last lamp being the least likely to light satisfactorily.

As a result of the impedance characteristic inherently exhibited by certain embodiments of the present alternator system, in particular the impedance resulting from the inductance of the phase windings and the magnetic circuit associated therewith, the alternator is able to energize HID lamps without the need for an external ballast or other comparable impedance device. In preferred embodiments, the impedance characteristic limits the current to HID lamps during both start-up and steady state lamp operation. The lamps are provided with a sustaining voltage for maintaining of current between a pair of spaced electrodes of the lamp for generating output light. Each winding has an alternating current voltage output having a sustaining voltage substantially at the zero crossover of current sufficient to maintain full lamp-on operation. Each winding further has an alternating current sustaining voltage output including a relatively steep voltage change substantially at the zero crossover of current, whereby full lamp-on operation in each phase is maintained through the AC cycle. The impedance characteristic also creates a strike voltage to initiate turn-on of the lamps.

Figure 3A:
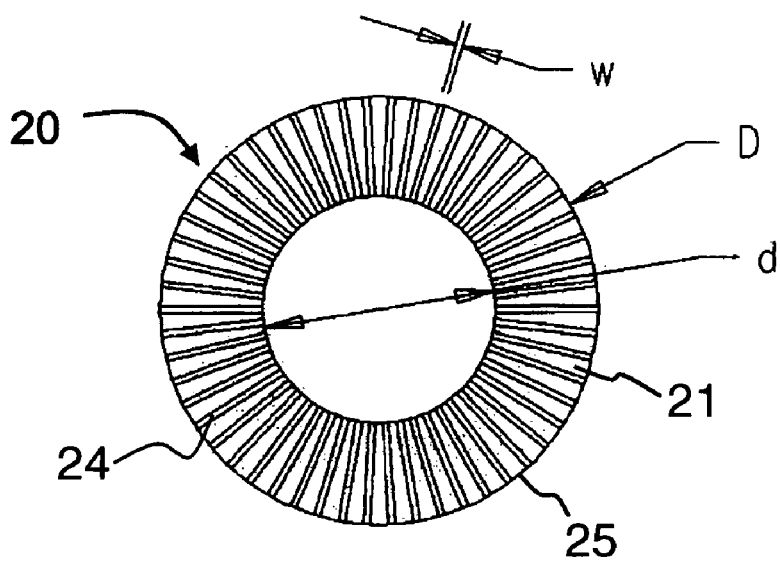
FIGS. 3A and 3B are top and side views, respectively, of a stator structure used in an alternator of the invention, showing the stator core with machined stator slots and the backiron.
Figure 3B:
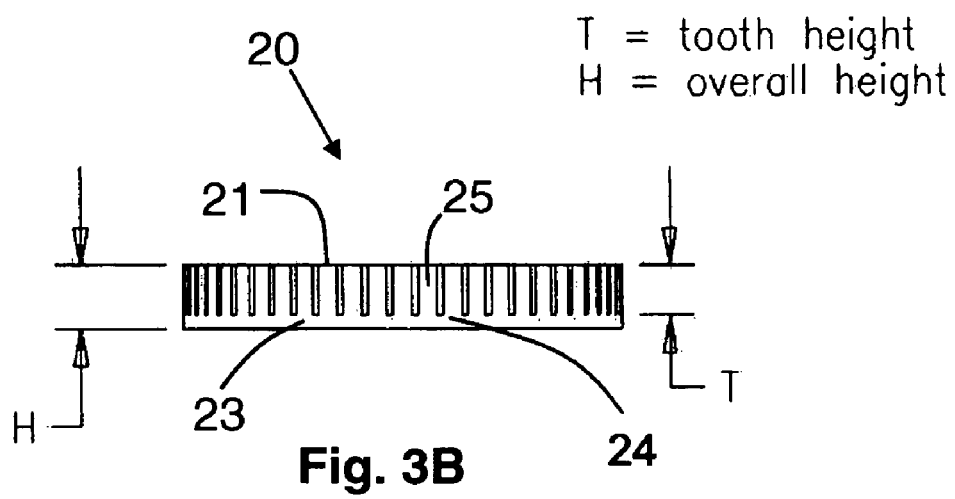

One form of stator core suitable for an axial airgap implementation of the present alternator is depicted by FIGS. 3A and 3B. Such a stator core structure is provided by commonly assigned U.S. Provisional Application Ser. No. 60/444,271 ("the '271 application") and U.S. patent application Ser. No. 10/769,094 ("the '094 application"), each of which is incorporated herein in the entirety by reference thereto.

Figure 4:
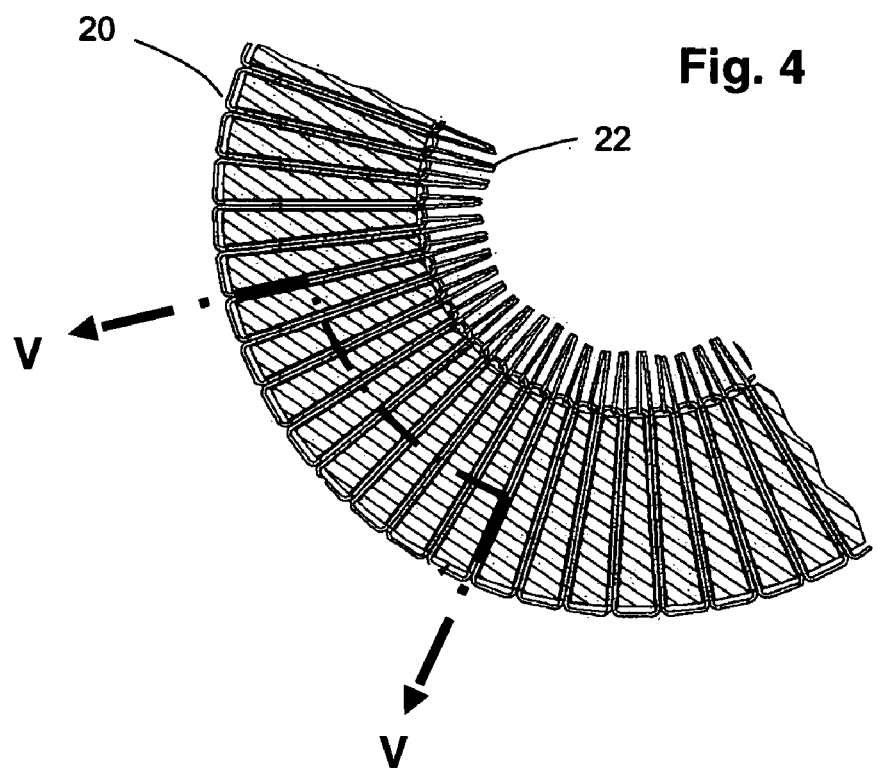
FIG. 4 is a top view illustrating a section of the stator structure of FIGS. 3A and 3B wound with stator phase windings.

A stator provided by the '094 application includes a backiron section and a plurality of stator tooth sections, preferably constructed using low-loss, high-frequency materials. FIG. 3 illustrate in top view (FIG. 3A) and side view (FIG. 3B) a part of a stator assembly 20 according to an aspect of the '094 application, showing a unitary structure including stator tooth sections 25 depending from backiron section 23. Slot spaces 24 between adjacent tooth sections are appointed to receive stator coils 22 wound around the tooth sections 25, as shown in FIG. 4. Preferably the one or more stators are formed from low-loss materials, such as amorphous metal, nanocrystalline metal, or optimized Fe-based alloy. Alternatively, grain-oriented or non-grain-oriented Fe-based material may be used. The backiron and tooth sections may be formed either as the unitary structure depicted, in which the tooth sections 25 depend integrally from backiron section 23, or as separate components secured together by any appropriate means. For example, the constituent parts may be joined using an adhesive, clamping, welding, or other methods known in the art. A variety of adhesive agents may be suitable, including those composed of epoxies, varnishes, anaerobic adhesives, cyanoacrylates, and room-temperature-vulcanized (RTV) silicone materials. Adhesives desirably have low viscosity, low shrinkage, low elastic modulus, high peel strength, high operating temperature capability, and high dielectric strength. The stator construction depicted by FIGS. 3A–3B is useful in the practice of the present invention, as are other forms of stator construction provided by the aforementioned '271 and '094 applications, and still others that incorporate low loss materials and are compatible with the winding configuration described herein.

The present dynamoelectric machine further includes a rotor assembly supported for rotation about an axis and being arranged and disposed for magnetic interaction with the stator assembly. The present machine may comprise one or more rotor assemblies and one or more stator assemblies. Accordingly, the terms "a rotor" and "a stator" as used herein with reference to electric machines mean a number of rotor and stator assemblies ranging from one to as many as three or more. In a preferred embodiment, the present machine is an axial airgap, brushless device employing a disk-like rotor assembly comprising a plurality of circumferentially spaced-apart permanent magnets.

Figure 5:
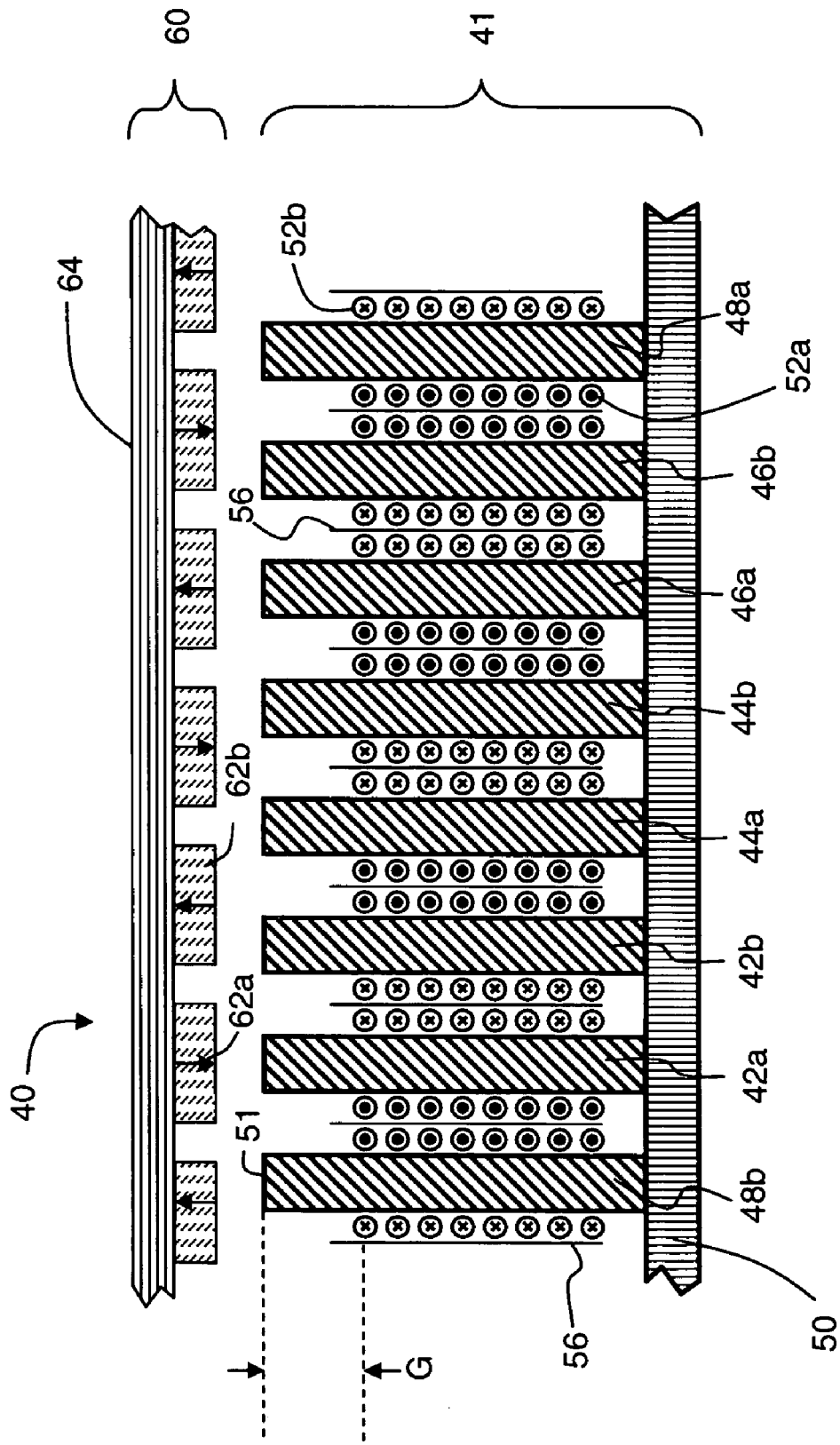
FIG. 5 is a fragmentary, schematic cross-sectional view of the stator structure and windings of FIG. 4 taken at V—V, along with a portion of a rotor assembly associated with the stator.

In a further aspect, there is provided a stator winding configuration whereby magnetic interaction between phases that share the same stator core is minimized. Referring now to FIG. 5, there is generally illustrated a cross-sectional view of an axial airgap embodiment 40 having a single rotor assembly 60 and a single stator assembly 41 having a novel winding configuration. It will be understood that the view of FIG. 5 is schematic, depicting an arcuate segment V—V of the FIG. 4 configuration as if were stretched into a planar form. Stator assembly 41 of FIG. 5 comprises tooth sections, e.g. teeth 42a–b, 44a–b, 46a–b, and 48a–b, depending from backiron section 50 and coil windings 52a, 52b encircling each tooth. Preferably the stator core is constructed using low core loss materials such as amorphous metals, nanocrystalline metals, optimized Si—Fe alloys, grain-oriented Fe-based materials or non-grain-oriented Fe-based materials. Rotor assembly 60 comprises a rotor backing 64 and a plurality of equi-circumferentially spaced apart permanent magnets having alternating polarities, e.g. magnets 62a and 62b. Backing 64 is preferably constructed using a magnetically permeable, ferromagnetic material to permit closure of magnetic flux emanating from the side of magnets 62 opposite the stator. More preferably, backing 64 comprises a wound toroid of low-loss soft magnetic material, such as ribbon-form amorphous metal. The use of a layered, low-loss material in backing 64 decreases deleterious eddy current losses that otherwise result from changes in magnetic flux resulting from the changing permeance of the overall rotor-stator magnetic circuit as magnets 62 rotate into and out of alignment with the stator teeth.

Stator assembly 41 provides windings for four electrical phases. Sequential adjacent pairs of teeth, i.e. teeth 42a–b, 44a–b, 46a–b, and 48a–b, are apportioned, respectively, to phases A, B, C, and D. The sequence is repeated circumferentially around the stator core, with each phase having equal numbers of pairs of teeth. A coil winding comprising at least one turn of conductive wire encircles each tooth. For simplicity of illustration, FIG. 5 depicts each coil as comprising eight turns of wire having a round cross-section and disposed in a single layer, but more turns in more layers are ordinarily present. Ordinarily, an inexpensive, highly conducting wire such as Cu or Al wire is preferred for the stator phase windings, but other materials may also be used, including other metals and alloys and superconductors. The wire may have any cross-section, but round and square wires and thin tape are most common. In certain high frequency applications, stranded wires or Litz wire may be advantageous. An insulator 56, preferably composed of a sheet-form dielectric material such as kraft paper or a polymeric film, ordinarily but not necessarily separates the turns of the coils encircling adjacent teeth. The side and bottom walls of the slot are similarly insulated in most embodiments.

The coils encircling the teeth of each pair in the FIG. 5 embodiment are connected in series opposition. In particular, the sense of positive current flow in each turn is indicated by symbols, "⊙" denoting, in the cross-section of the various windings, a current flow out of the plane of the figure, e.g. as present in turn 52a, and "⊗" a current flow into the plane of the figure, e.g. turn 52b. For example, a positive current flow through the coils of paired teeth 42a and 42b produces a magnetomotive force that is upwardly and downwardly directed in teeth 42a and 42b, respectively. The coils of the pairs of teeth allocated to each of the phases A–D are themselves further connected in series to provide the respective terminal outputs of the phases. In accordance with industry convention, the machine is usually wired in a wye connection with a common neutral, but other configurations may also be employed.

Figure 6:
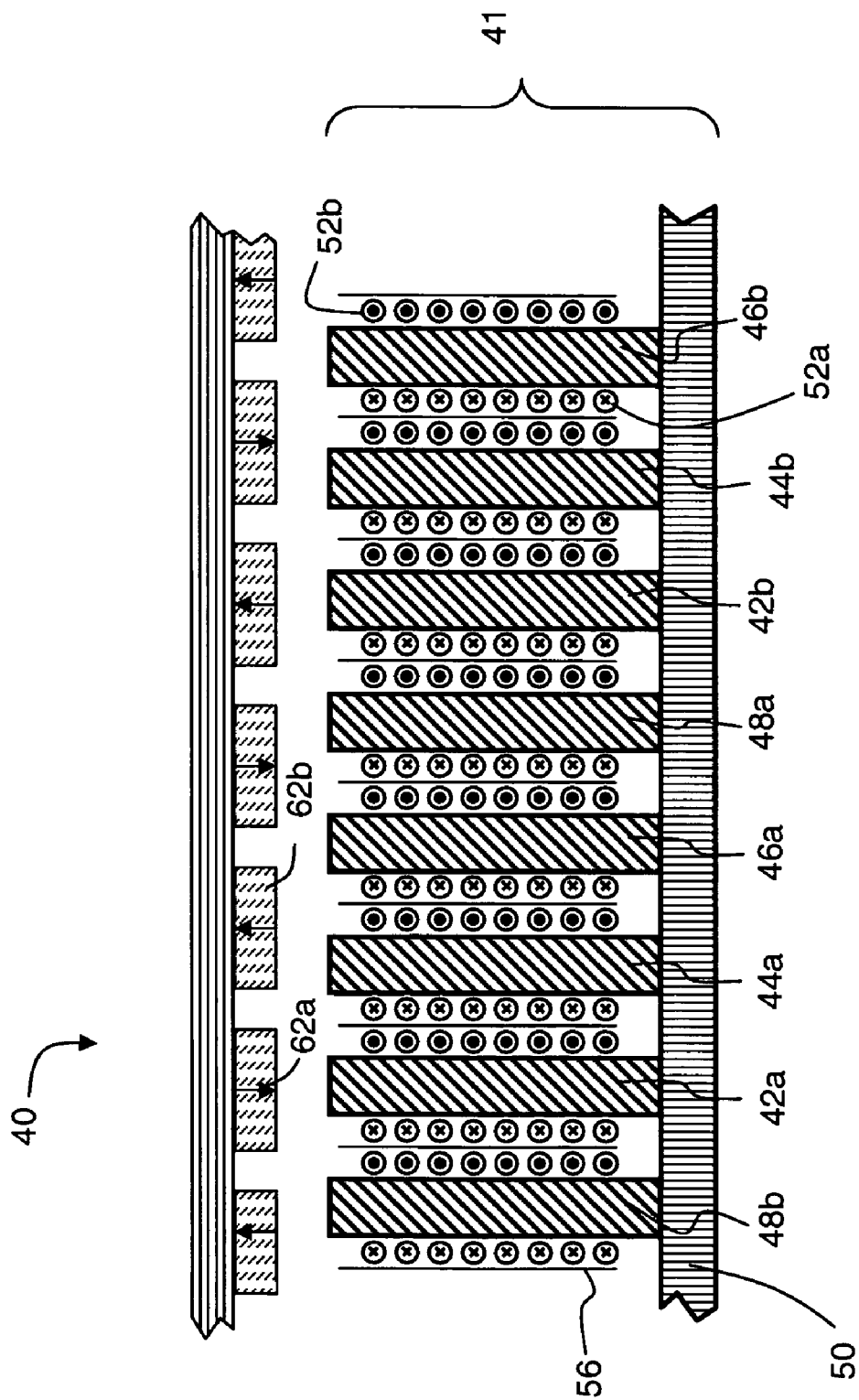
FIG. 6 is a fragmentary, schematic cross-sectional view of a stator structure and windings, along with a portion of a rotor assembly associated therewith, the winding configuration being of the prior art.

The allocation of pairs of adjacent teeth to a single phase and the connection of the windings of said teeth in series opposition in the present alternator is unconventional. By way of contrast, a conventional arrangement of teeth and windings in a four-phase configuration is shown in FIG. 6. The teeth allocated to a given phase, e.g. teeth 42a and 42b for phase A, are not adjacent, but are separated by intervening teeth, one for each of the other phases. In addition, the teeth are all wound in the opposite sense.

Figure 7:
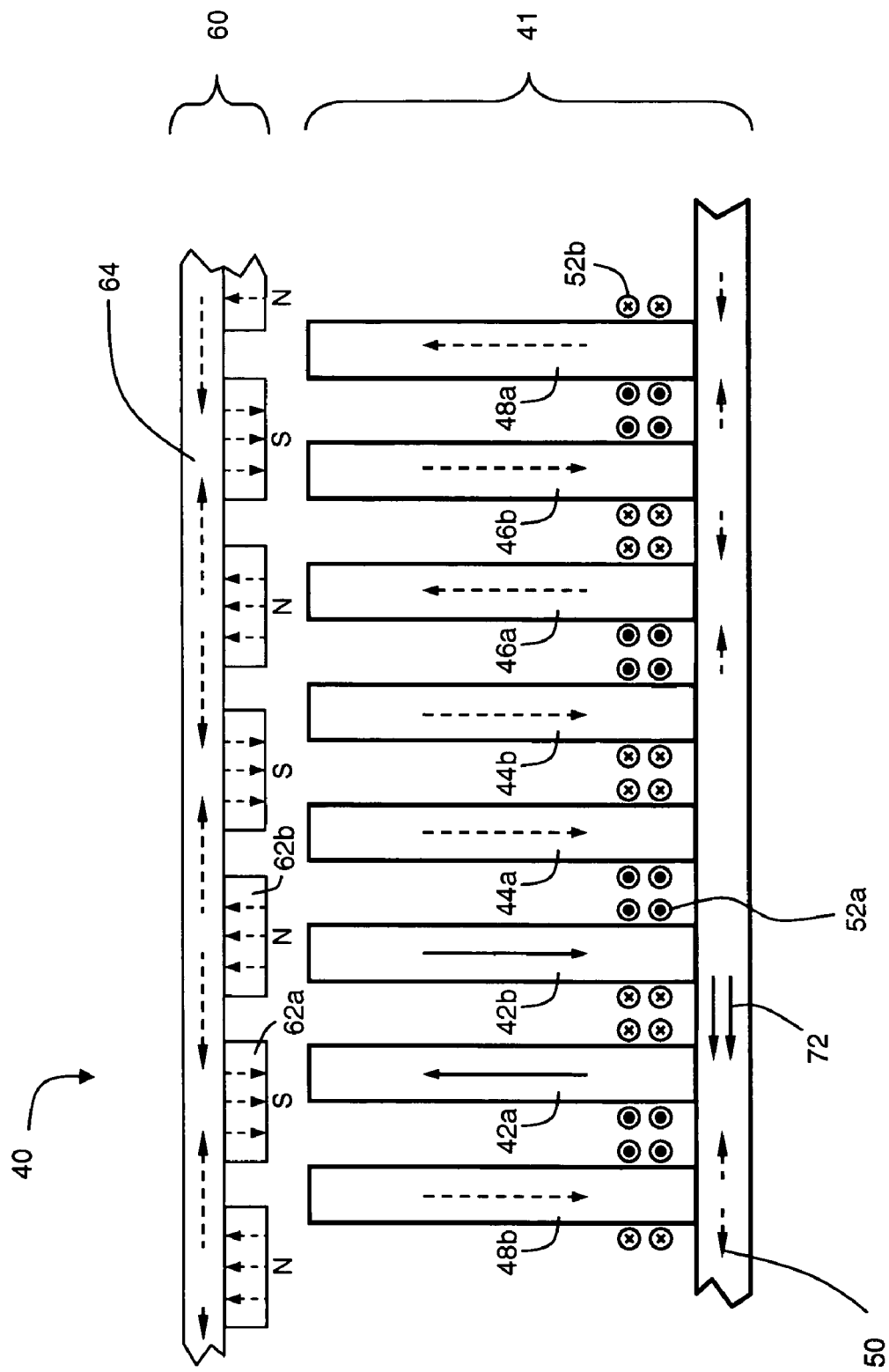
FIG. 7 is a schematic view a magnetic flux pattern extant in the alternator structure of FIG. 5 at a point during operation thereof.
Figure 8:
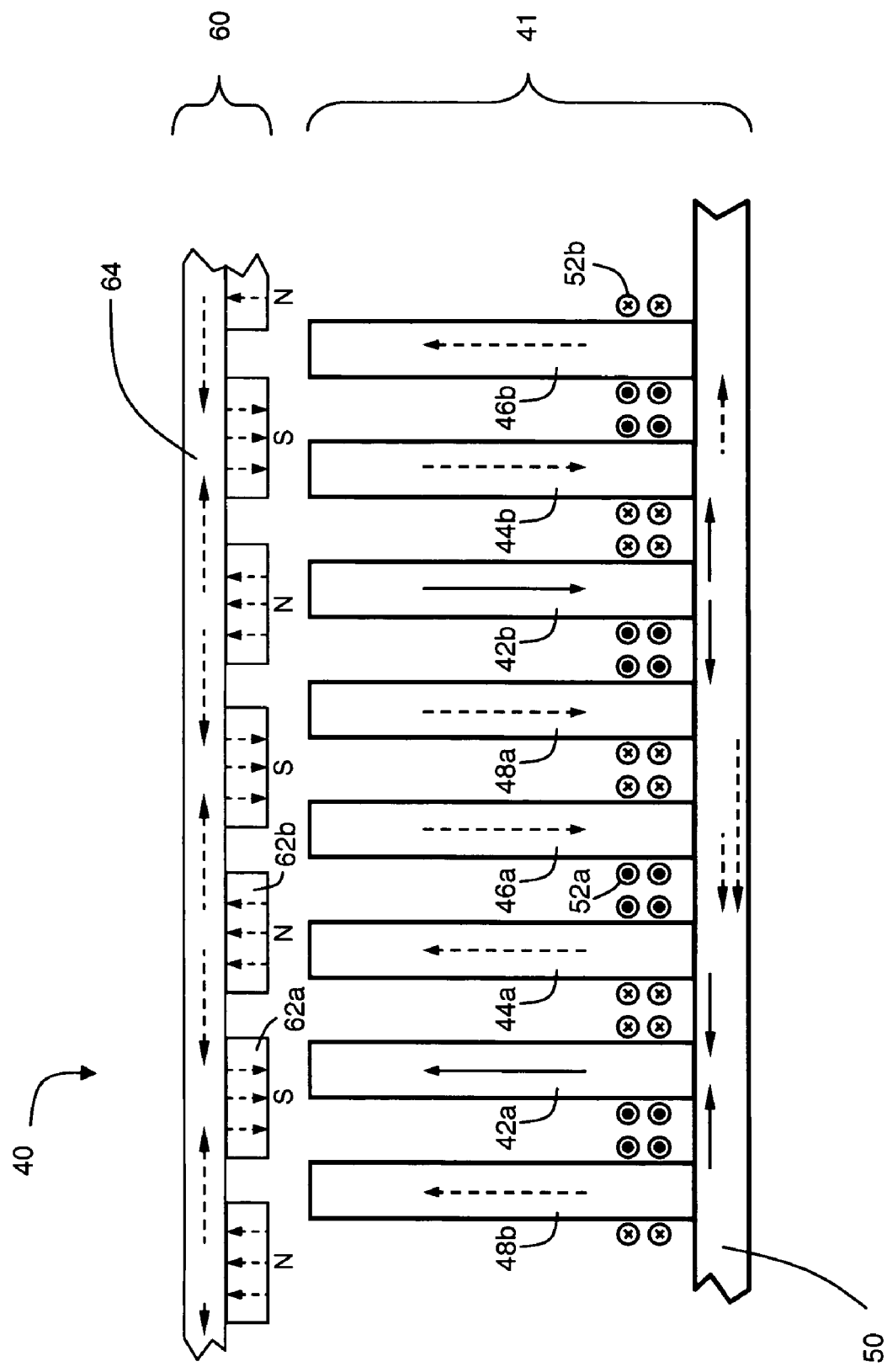
FIG. 8 is a schematic view depicting a magnetic flux pattern extant in the alternator structure of FIG. 6 at a point during operation thereof.

The present unconventional allocation and winding provides substantial magnetic isolation between the phases. For example, FIGS. 7 and 8 illustrate how the flux patterns at the point of peak current in phase A in the configurations of FIGS. 5 and 6, respectively, differ. For clarity of illustration, most of the windings shown in FIGS. 5 and 6 have been omitted in FIGS. 7 and 8. The magnetic circuit for each phase involves: (i) the magnetic materials of the rotor and stator and associated airgaps through which flux attributable to that phase passes; and (ii) the relevant sources of magnetomotive force, specifically the rotor magnets and the electrical currents in the phase windings that produce back emfs. In FIGS. 7 and 8, dashed lines indicate flux arising from the magnetomotive force of the magnets in rotor 60, while solid lines indicate flux produced by magnetomotive forces associated with the current flow in the alternator load in phase A. In a lighting system, for example, this current is drawn by the HID lamp of phase A. In the present alternator (FIG. 7) the substantial flux in the Phase A teeth 42a, 42b, the net result of oppositely directed magnetomotive forces from the rotor magnets and the back-emf current flow, closes through a short path in backiron 50, as indicated by the double arrow 72. Comparable short paths linking other adjacent teeth are available for all four phases at their respective peak currents. On the other hand, the peak phase A flux in teeth 42a and 42b in the prior art alternator (FIG. 8) closes through a more complicated path. The flux must traverse the backiron behind the intervening teeth (e.g., 44a, 46a, 48a) along with flux both from back emf currents in the other phases and from the rotor magnets. At a point of high current in any one of the phases, part of the backiron can saturate and thereby reduce the magnitude of flux that can be linked through the teeth of the other phases. Reduction in the flux available in the other phases, in turn, reduces the terminal voltage output of those phases. Under some conditions, the voltage drops below that required for HID startup. Such a reduction is believed to account for the difficulties frequently experienced in using such prior art machines to drive HID lamps, including the propensity of at least the last lamp not to reliably start.

The paired adjacent teeth apportioned to each of the four phases in the stator winding configuration depicted by FIG. 5 are effectively 45 electrical degrees apart. As a result, the steady-state output of the machine is modestly reduced, by a factor of $\cos(45°/2)=\cos(22.5°)=0.924$ from what would be provided by the configuration of FIG. 6 during balanced operation. The output reduction is different in alternators having other than four phases. For example, winding the general stator structure seen in FIG. 5 with three phases (i.e., with a repeating sequence of three pairs of teeth instead of four pairs) produces an output reduced by a slightly larger factor $\cos(60°/2)=\cos(30°)=0.866$, since the teeth are effectively 60 electrical degrees apart. Even that reduction is an acceptable tradeoff for the present alternator, because the configuration exhibits a markedly reduced tendency for the lamps of the system to fail to start up and operate reliably and independently. Other approaches to ameliorate the start-up problem have included increasing the alternator size to a level sufficient even under the high load during start-up to effect reliable operation. The approach taken by the '450 patentees, namely the provision of an independent alternator unit for each lamp, avoids the problem. But with both these approaches, the cost is a device that is considerably larger, more expensive, and less efficient, both in its use of the relatively expensive magnetic materials and in operating energy efficiency. The lowered efficiency is especially detrimental in a mobile light tower, since extra fuel must be carried for the system to run for a given time period.

In a further aspect the present alternator exhibits an impedance characteristic that allows direct HID lamp connection without the need for an additional, external ballast of the type ordinarily required to operate the lamp from a conventional, low impedance source. In an implementation, the inductance of the present alternator is increased by extending the teeth by a distance "G," as indicated in FIG. 5. That is to say, the coil is disposed over a portion of each tooth to a point of separation from the free end 51 opposite backiron 50 at which the tooth terminates. Distance G, which is measured between the point of separation and the free end of the tooth, is chosen to provide an alternator having a preselected inductance. In ordinary machine designs, the lowest attainable inductance and the minimum required amount of magnetic material are desired. Accordingly, G has heretofore been made as close to zero as practical within the constraints of manufacturability. More importantly, low inductance designs are conventionally selected, because they maximize usable machine output in generator applications and minimize required drive voltage in motoring applications. However, certain specialized applications benefit by having some finite inductance. In addition to the present lighting system, dynamoelectric machines operated with power electronics employing pulse width modulation control typically require some amount of inductance to limit undesirable current spikes. Although the requisite inductance can be provided by one or more discrete inductors in the power electronics circuitry, the presence of inductance inherent in the present machine simplifies the power electronics circuitry. An aspect of the present invention therefore provides a method for setting the inductance of an electrical machine, which could be any motor or generator, the method comprising the selection of the point of separation such that the separation is sufficient to provide the machine with a preselected inductance.

Although the mobile light tower application is one preferred use of the present system, the present concept finds other beneficial uses in conjunction with HID lighting, including more permanent, fixed installations. For example, HID lighting is common in industrial and commercial facilities, e.g. in parking lots, warehouses, factories, indoor and outdoor sports arenas and similar venues, and the like. Frequently, the fixtures are located in positions that are relatively difficult to access. As a result, the ability to eliminate the ballast of previous systems is highly beneficial, since installation and maintenance cost and difficulty can be reduced. Also eliminated is the often objectionable line-frequency hum generated by the ballasts during operation.

Figure 9:
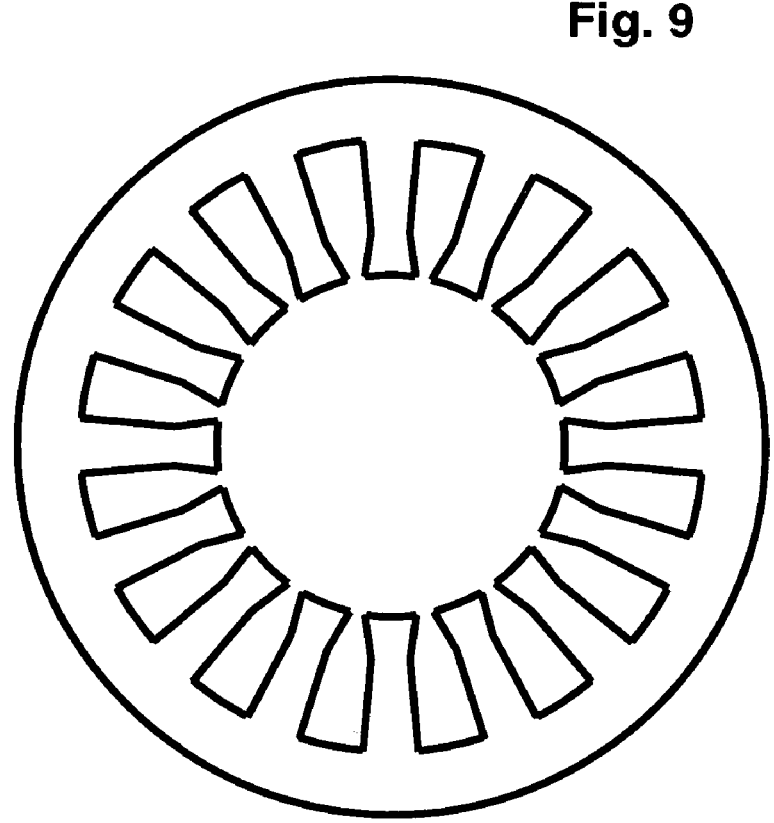
FIG. 9 is a schematic view a stator structure useful in a radial airgap embodiment of the alternator of the invention.

As an alternative to the coil side-by-side coil configuration depicted by FIG. 5, the present alternator may be constructed with stacked windings, as seen in FIG. 9 and disclosed in commonly assigned U.S. patent application Ser. No. 10/979,336, filed Nov. 2, 2004, which is incorporated herein in the entirety by reference thereto. By "stacked windings" is meant a winding configuration in which a plurality of coils, each encircling a stator tooth, are disposed in a layered sequence from the tooth root and extending to a level near the tooth free end, or face. Preferably, two coils are present in each slot. The stacked coil configuration can be used in conjunction with embodiments wherein the stator comprises separate teeth and backiron sections, in which case the coils may be wound onto the teeth before or after the components are assembled. The coils may also be formed as separate assemblies and then slipped into position over the free end of tooth sections. In certain embodiments, the stacked coil configuration advantageously permits more efficient filling of the stator slots.

In another aspect of the invention, there is provided a method for constructing and winding a stator assembly, such as that depicted by FIGS. 3–4 and others described herein. A metal core is initially formed by spirally winding low-loss, high-frequency magnetic strip material into a toroid. This toroid has the shape of a generally right circular cylindrical shell having an inner diameter and an outer diameter when viewed in the axial direction. The annular end surface region 21 extending radially from inner diameter "d" to outer diameter "D", and circumferentially about the as-formed full toroid, defines a surface area. The metal core has an axial extent that defines a toroid height "H." After winding, the core is machined to provide slots 24 having outer width "w" that are generally radially directed. The depth of slots 24 extends axially only part-way through the toroid height, thereby defining teeth and slots having a slot height "T." The slots reduce the total end surface area of the metal core. The portion of the annular region left after the removal of the slots is the total area (TA), also referred to as the amorphous metal area (AMA) for the embodiments in which the low-loss, high-frequency material is an amorphous metal. Because the slots 24 extend fully from the inner diameter d to the outer diameter D, the stator core's circumference at the inside and outside diameters in the slotted portion of the toroid are not continuous. The removal of material from the slot spaces produces a plurality of teeth 25. There are an equal number of teeth and slots. The circumferentially continuous material that remains below the slot depth may function as the backiron section 23, which provides closure for flux in the tooth sections 25. In preferred embodiments, the narrowest part of a tooth is not less than 0.1 inch (2.5 mm) for the sake of formability and mechanical integrity. The slots 24 are wound with conducting stator coils 22 according to a winding scheme preselected for a given electric device design.

The stator assembly 20, along with stator windings, can be placed in a stator carrier (not shown). Preferably the stator assembly is potted within the stator carrier using an appropriate organic dielectric, such as one that does not induce excessive stress in the stator magnetic material. While the stator carrier is preferably non-magnetic, there is no restriction on the conductivity of the stator carrier material. Factors that can influence the choice of stator carrier material include required mechanical strength and thermal properties. Any appropriate material able to properly support the stator assembly may be used as a stator carrier. In a specific embodiment, the stator carrier is formed from aluminum.

Low Loss Stator Materials

The incorporation of amorphous, nanocrystalline, or optimized Fe-based alloy, or grain-oriented or non-grain-oriented Fe-based material in preferred embodiments of the present electrical machine enables the machine's commutating frequency to be increased well above typical line frequencies, to values as high as 400 Hz or more, with only a relatively small increase in core loss, as compared to the unacceptably large increase that would be seen in conventional machines. The use of the low-loss materials in the stator core accordingly allows the development of high-frequency, high pole count, electric devices capable of providing increased power density, and improved efficiency without excessive thermal derating. Preferably the stator assembly comprises laminated layers composed of at least one material selected from the group consisting of amorphous, nanocrystalline, or optimized Fe-based alloy.

Amorphous Metals

Amorphous metals exist in many different compositions suitable for use in the present alternator. Metallic glasses are typically formed from an alloy melt of the requisite composition that is quenched rapidly from the melt, e.g. by cooling at a rate of at least about $10^{6 \circ}$ C./s. They exhibit no long-range atomic order and have X-ray diffraction patterns that show only diffuse halos, similar to those observed for inorganic oxide glasses. A number of compositions having suitable magnetic properties are set forth in U.S. Pat. No. RE32,925 to Chen et al. Amorphous metal is typically supplied in the form of extended lengths of thin ribbon (e.g. a thickness of at most about 50 μm) in widths of 20 cm or more. A process useful for the formation of metallic glass strips of indefinite length is disclosed by U.S. Pat. No. 4,142,571 to Narasimhan. An exemplary amorphous metal material suitable for use in the present invention is METGLAS® 2605 SA1, sold by Metglas, Inc., Conway, S.C. in the form of ribbon of indefinite length and up to about 20 cm wide and 20–25 μm thick (see http://www.metglas.com/products/page5_1_2_4.htm). Other amorphous materials with the requisite properties may also be used.

Amorphous metals have a number of characteristics that must be taken into account in the manufacture and use of magnetic implements. Unlike most soft magnetic materials, amorphous metals (also known as metallic glasses) are hard and brittle, especially after the heat treatment typically used to optimize their soft magnetic properties. As a result, many of the mechanical operations ordinarily used to process conventional soft magnetic materials for dynamoelectric machines are difficult or impossible to carry out on amorphous metals. Stamping, punching, or cutting as-produced material generally results in unacceptable tool wear and is virtually impossible on brittle, heat-treated material. Conventional drilling and welding, which are often done with conventional steels, are also normally precluded.

In addition, amorphous metals exhibit a lower saturation flux density (or induction) than conventional Si—Fe alloys. The lower flux density ordinarily results in lower power densities in machines designed according to conventional methods. Amorphous metals also have lower thermal conductivities than Si—Fe alloys. As thermal conductivity determines how readily heat can be conducted through a material from a warm location to a cool location, a lower value of thermal conductivity necessitates careful design of the machine to assure adequate removal of waste heat arising from core losses in the magnetic materials, ohmic losses in the windings, friction, windage, and other loss sources. Inadequate removal of waste heat, in turn, would cause the temperature of the machine to rise unacceptably. Excessive temperature is likely to cause premature failure of electrical insulation or other machine components. In some cases, the over-temperature could cause a shock hazard or trigger catastrophic fire or other serious danger to health and safety. Amorphous metals also exhibit a higher coefficient of magnetostriction than certain conventional materials. A material with a lower coefficient of magnetostriction undergoes smaller dimensional change under the influence of a magnetic field, which in turn would likely reduce audible noise from a machine, as well as render the material more susceptible to degradation of its magnetic properties as the result of stresses induced during machine fabrication or operation.

Despite these challenges, an aspect of the present invention provides an alternator that successfully incorporates advanced soft magnetic materials and permits operation with high frequency excitation, e.g., a commutating frequency greater than about 400 Hz. Construction techniques for the fabrication of the alternator are also provided. As a result of the configuration and the use of advanced materials, especially amorphous metals, the present invention successfully provides an alternator that operates at high frequencies (defined as commutating frequencies greater than about 400 Hz) with a high pole count. The amorphous metals exhibit much lower hysteresis losses at high frequencies, which result in much lower core losses. Compared to Si—Fe alloys, amorphous metals have much lower electrical conductivity and are typically much thinner than ordinarily used Si—Fe alloys, which are often 200 μm thick or more. Both these characteristics promote lower eddy current core losses. The invention successfully provides a machine that benefits from one or more of these favorable attributes and thereby operates efficiently at high frequencies, using a configuration that permits the advantageous qualities of the amorphous metal, such as the lower core loss, to be exploited, while avoiding the challenges faced in previous attempts to use advanced materials.

Nanocrystalline Metals

Nanocrystalline materials are polycrystalline materials with average grain sizes of about 100 nanometers or less. The attributes of nanocrystalline metals as compared to conventional coarse-grained metals generally include increased strength and hardness, enhanced diffusivity, improved ductility and toughness, reduced density, reduced modulus, higher electrical resistance, increased specific heat, higher thermal expansion coefficients, lower thermal conductivity, and superior soft magnetic properties. Nanocrystalline metals also have somewhat higher saturation induction in general than most Fe-based amorphous metals.

Nanocrystalline metals may be formed by a number of techniques. One preferred method comprises initially casting the requisite composition as a metallic glass ribbon of indefinite length, using techniques such as those taught hereinabove, and forming the ribbon into a desired configuration such as a wound shape. Thereafter, the initially amorphous material is heat-treated to form a nanocrystalline microstructure therein. This microstructure is characterized by the presence of a high density of grains having average size less than about 100 nm, preferably less than about 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of a device comprising the component. The heat treatment needed to produce the nanocrystalline structure in a given alloy must be carried out at a higher temperature or for a longer time than would be needed for a heat treatment designed to preserve therein a substantially fully glassy microstructure. Preferably, the nanocrystalline metal is an iron-based material. However, the nanocrystalline metal could also be based on or include other ferromagnetic materials, such as cobalt or nickel. Representative nanocrystalline alloys suitable for use in constructing magnetic elements for the present device are known, e.g. alloys set forth in U.S. Pat. No. 4,881,989 to Yoshizawa and U.S. Pat. No. 5,935,347 to Suzuki et al. Such materials are available from Hitachi Metals, Vacuumschmelze GmbH, and Alps Electric. An exemplary nanocrystalline metal with low-loss properties is Hitachi Finemet FT-3M. Another exemplary nanocrystalline metal with low-loss properties is Vacuumschmelze Vitroperm 500 Z.

Optimized Fe-Based Alloys

The present machine may also be constructed with optimized, low-loss Fe-based crystalline alloy material. Preferably such material has the form of strip having a thickness of less than about 125 μm, much thinner than the steels conventionally used in machines, which have thicknesses of 200 μm or more, and sometimes as much as 400 μm or more. Both grain-oriented and non-oriented materials may be used. As used herein, an oriented material is one in which the principal crystallographic axes of the constituent crystallite grains are not randomly oriented, but are predominantly correlated along one or more preferred directions. As a result of the foregoing microstructure, an oriented strip material responds differently to magnetic excitation along different directions, whereas a non-oriented material responds isotropically, i.e., with substantially the same response to excitation along any direction in the plane of the strip. Grain-oriented material is preferably disposed in the present machine with its easy direction of magnetization substantially coincident with the predominant direction of magnetic flux.

As used herein, conventional Si—Fe refers to silicon-iron alloys with a silicon content of about 3.5% or less of silicon by weight. The 3.5 wt. % limit of silicon is imposed by the industry due to the poor metalworking material properties of Si—Fe alloys with higher silicon contents. The core losses of the conventional Si—Fe alloy grades resulting from operation at a magnetic field with frequencies greater than about 400 Hz are substantially higher than those of low loss material. For example, in some cases the losses of conventional Si—Fe may be as much as 10 times those of suitable amorphous metal at the frequencies and flux levels encountered in machines operating under the frequency and flux levels taught herein. As a result, in many embodiments conventional material under high frequency operation would heat to a point at which a conventional machine could not be cooled by any acceptable means. However, some grades of silicon-iron alloys, herein referred to as optimized Si—Fe, are directly applicable to producing a high-frequency machine.

The optimized Fe-based alloys useful in the practice of the present invention include silicon-iron alloy grades comprising greater than 3.5% of silicon by weight, and preferably more than 4%. The non-grain-oriented Fe-based material used in constructing machines in accordance with the invention preferably consists essentially of an alloy of Fe with Si in an amount ranging from about 4 to 7.5 wt. % Si. These preferred alloys have more Si than conventional Si—Fe alloys. Also useful are Fe—Si—Al alloys such as Sendust.

More preferred non-oriented optimized alloys have a composition consisting essentially of Fe with about 6.5±1 wt. % Si. Most preferably, alloys having about 6.5% Si exhibit near-zero values of saturation magnetostriction, making them less susceptible to deleterious magnetic property degradation due to stresses encountered during construction or operation of a device containing the material.

The objective of the optimization is to obtain an alloy improved magnetic properties, including reduced magnetostriction and especially, lower core losses. These beneficial qualities are obtainable in certain alloys with increased silicon content made by suitable fabrication methods. In some cases, these optimized Si—Fe alloy grades are characterized by core losses and magnetic saturation similar to those of amorphous metal. However, alloys containing more than about 4 at. % Si are difficult to produce by conventional means because of their brittleness due to short-range ordering. In particular, conventional rolling techniques used to make conventional Si—Fe are generally incapable of making optimized Si—Fe. However, other known techniques are used to make optimized Si—Fe.

For example, one suitable form of Fe-6.5Si alloy is supplied as magnetic strips 50 and 100 μm thick by the JFE Steel Corporation, Tokyo, Japan (see also http://www.jfe-steel.co.jp/en/products/electrical/supercore/index.html). Fe-6.5% Si produced by rapid solidification processing, as disclosed by U.S. Pat. No. 4,865,657 to Das et al. and U.S. Pat. No. 4,265,682 to Tsuya et al., also may be used. Rapid solidification processing is also known for preparing Sendust and related Fe—Si—Al alloys.

Loss Behavior of Preferred Soft Magnetic Materials

A major contribution to the improved losses in the materials preferred for the present stator results from significantly reduced hysteresis losses. As is known in the art, hysteresis losses result from impeded domain-wall motion during the magnetization of all soft magnetic materials. Such losses are generally higher in conventionally used magnetic materials, such as conventional grain-oriented Si—Fe alloys and non-oriented motor and electrical steels, than in the improved materials preferably employed in the present machines. High losses, in turn, can contribute to the overheating of the core.

More specifically, it is found that the core loss of soft magnetic materials can generally be expressed by the following modified Steinmetz equation:

$$L = a \cdot f \cdot B^b + c \cdot f^d \cdot B^e \quad (1)$$

wherein:
L is the loss in W/kg,
f is the frequency in kHz,
B is the magnetic flux density in peak Tesla, and
a, b, c, and d and e are all empirical loss coefficients specific to any particular soft magnetic material.

Each of the above loss coefficients a, b, c, d and e, can generally be obtained from the manufacturer of a given soft magnetic material. Especially preferred for use in the present stator structure are low core loss magnetic materials characterized by a core loss less than "L" where L is given by a form of Eqn. (1), in which $L = 12 \cdot f \cdot B^{1.5} + 30 \cdot f^{2.3} \cdot B^{2.3}$.

Rotor Structure

Figure 10A:
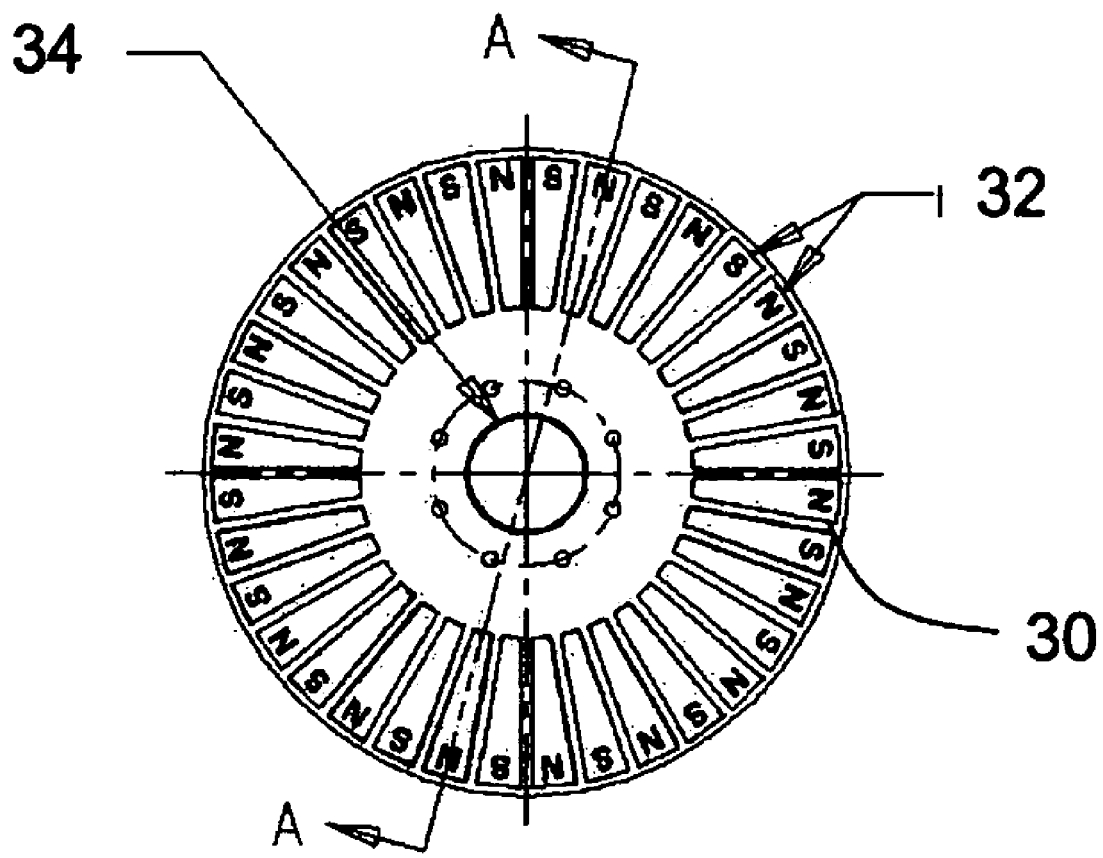
FIGS. 10A and 10B are top and side views, respectively, of a rotor structure of the present invention, showing the location and polarity of the rotor magnets.
Figure 10B:
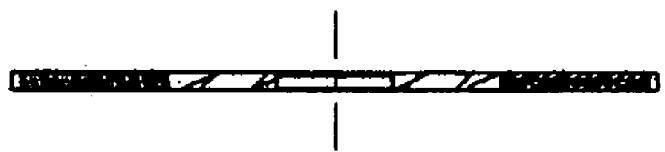

In a further aspect of the present invention there is provided an axial airgap, brushless, permanent magnet alternator, wherein a rotor structure is placed adjacent to the stator body on a common axis. FIG. 10A illustrates a top view of a rotor 30 suitable for an axial embodiment of the present machine. FIG. 10B illustrates a side view of the rotor taken along line A of FIG. 10A. Rotor 30 and its magnets 32 are supported for rotation about a machine axis, e.g., on a shaft 34 or any other suitable arrangement such that the poles of the magnets are accessible along a predetermined path adjacent the one or more stator assemblies. Ordinarily the shaft is supported by bearings of any suitable type known for rotating machines. The magnet area on the rotor has an outer diameter and an inner diameter. In a preferred embodiment, for an axial airgap type rotor, the magnets possess alternating polarity and are securely positioned circumferentially about the rotor with substantially equal spacing. Different parameters of the rotor magnets, such as size, position, angle, skew, shape, and the like, are selected to achieve the desired performance. Preferably, the outer diameter and inner diameter of the magnets 32 are substantially identical to those of the stator assemblies 20. If the outer diameter of the magnets 32 is greater than that of the stator tooth sections 21, then the outer portion of the rotor does not contribute appreciably to performance. If the outer diameter of the rotor is smaller than that of the stator tooth sections 21, the result is a reduction in performance of the electric device. In either case, some of the hard or soft magnetic material present in the machine increases cost and weight, but without improving performance. In some cases, the extra material even diminishes performance of the machine.

Alternatively, the permanent magnet rotor assembly can take any form that secures the magnets for rotation in proximity to the faces of the stator teeth. For example, the rotor magnets 32 can be set into, or mounted onto, a rotor carrier. The rotor assembly can include any number of rotor magnets 32. In some embodiments, the rotor magnets extend through the thickness of the rotor, while in others, they do not.

The magnets can be spaced such that there is little or no circumferential clearance between alternating magnets. It is preferable that the spacing between the magnets be selected to have an optimum value, which also minimizes the occurrence of torque cogging. An optimum spacing is derived from first dividing the low-loss metal area of the stator by the number of stator slots to get the area of each single metal core tooth. The optimum spacing between the magnets will then be such that the total area of each magnet equals 175±20% of the area of a core tooth.

Figure 11:
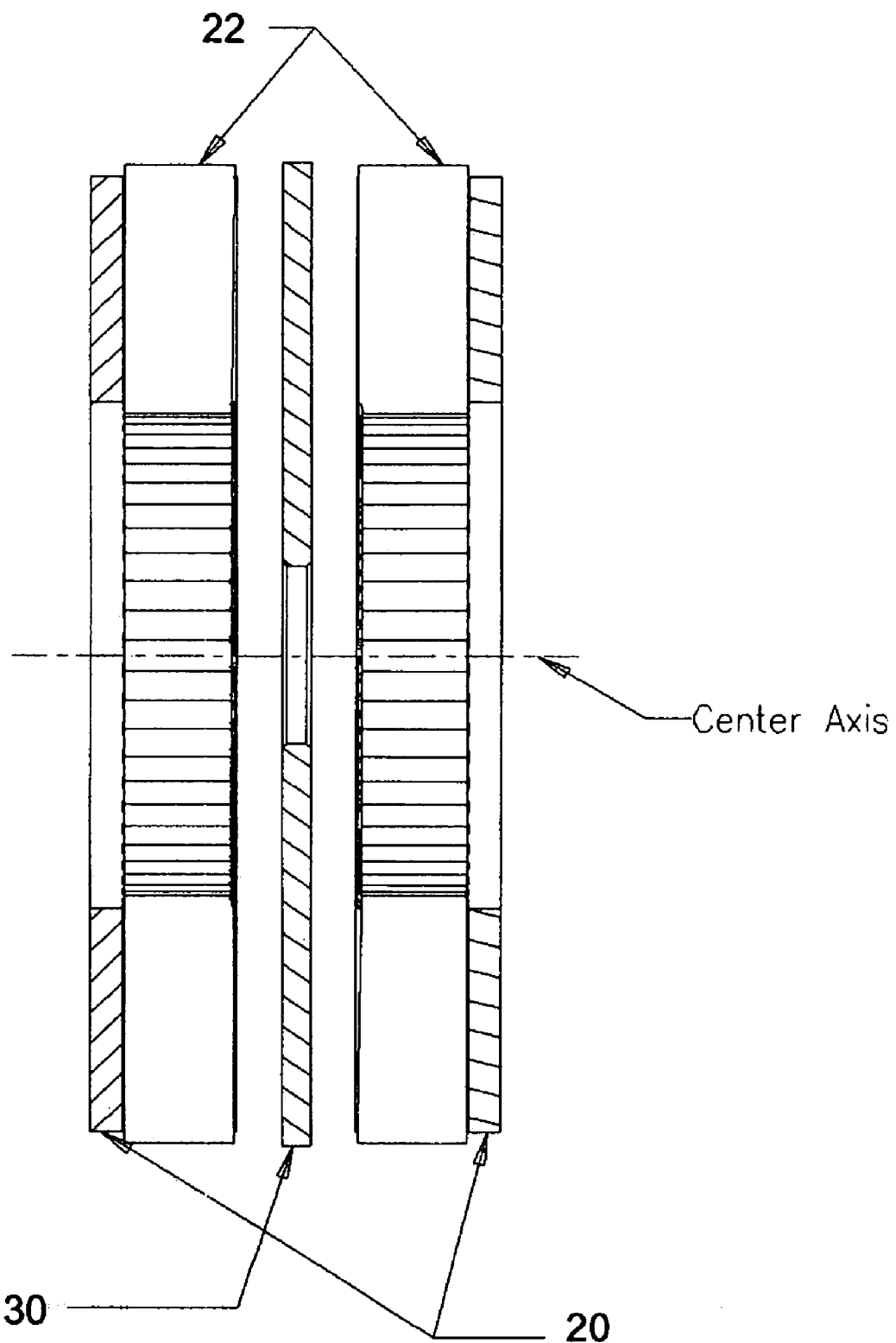
FIG. 11 illustrates an arrangement of two stator assemblies and a rotor assembly therebetween for an axial airgap-type alternator of the invention.

The rotor assembly of FIG. 9 may be used either with a single stator assembly or with two substantially identical stator assemblies mounted proximate opposite faces of the rotor assembly, as shown in FIG. 11. Depicted therein is a side view of an embodiment of an alternator that includes two stators positioned in an axial-type arrangement on either side of, and along a common center axis with a single rotor, which serves both stators 20. Ordinarily, the rotor used in the configuration of the FIG. 11 embodiment is constructed without the backing 64 depicted in FIG. 5, since flux from the rotor magnets is closed on both sides by the respective stators 20. In a specific embodiment, an electric device including amorphous metal stators on either side of a single rotor is found to exhibit a high power density. Such a configuration beneficially reduces axial thrust on the rotor, since the attraction between the rotor and the respective stators is oppositely directed and substantially offset.

In some embodiments, the opposing stators are substantially identical, each having windings for all the phases. In other embodiments, the opposing stators are similar but have windings for different phases. Preferably in such embodiments, the phases are equally apportioned between the stators. For example, a configuration having two stators with three phases each can be used in a six-lamp mobile light tower system, with each lamp energized by a different phase winding. Still other embodiments use different opposite stators that need not have the same numbers of phases and teeth. For example, one stator having four phases may be used to power a four HID lamp assembly, while the other includes windings adapted to generate electrical power to be supplied for other requisite non-lighting appliances, e.g. to power machinery used at a construction site.

In yet another embodiment, the present lighting system is implemented using the propulsion engine of a motor vehicle, such as a construction vehicle, as the prime mover. For example, the alternator could be driven by a belt drive taken from the crankshaft of the vehicle engine.

Rotor Materials

Any type of permanent magnet can be used in the present rotor. Rare earth-transition metal alloy magnets such as samarium-cobalt magnets, other cobalt-rare earth magnets, or rare earth-transition metal-metalloid magnets, e.g., NdFeB magnets, are especially suitable. Alternatively, the rotor magnet structure comprises any other sintered, plastic-bonded, or ceramic permanent magnet material. Preferably, the magnets have high maximum BH energy product, high coercivity, and high saturation magnetization, along with a linear second-quadrant normal demagnetization curve. More preferably, oriented and sintered rare earth-transition metal alloy magnets are used, since their higher energy product increases flux and hence torque, while allowing the volume of expensive permanent magnet material to be minimized. Preferably, the rotor arrangement comprises a disk or axial type rotor assembly including circumferentially spaced-apart, high energy product permanent magnets, such as rare earth-transition metal (e.g., SmCo) or rare earth-transition metal-metalloid magnets (e.g., NdFeB and NdFeCoB), each having opposite ends defining north and south poles.

Although the rotor magnets have been described as permanent magnets, alternate embodiments of the present machine employ other types of magnetic material or electromagnets. For example, an induction machine may employ laminated soft magnetic material, while a switched reluctance machine may have a solid iron rotor.

Figure 12:
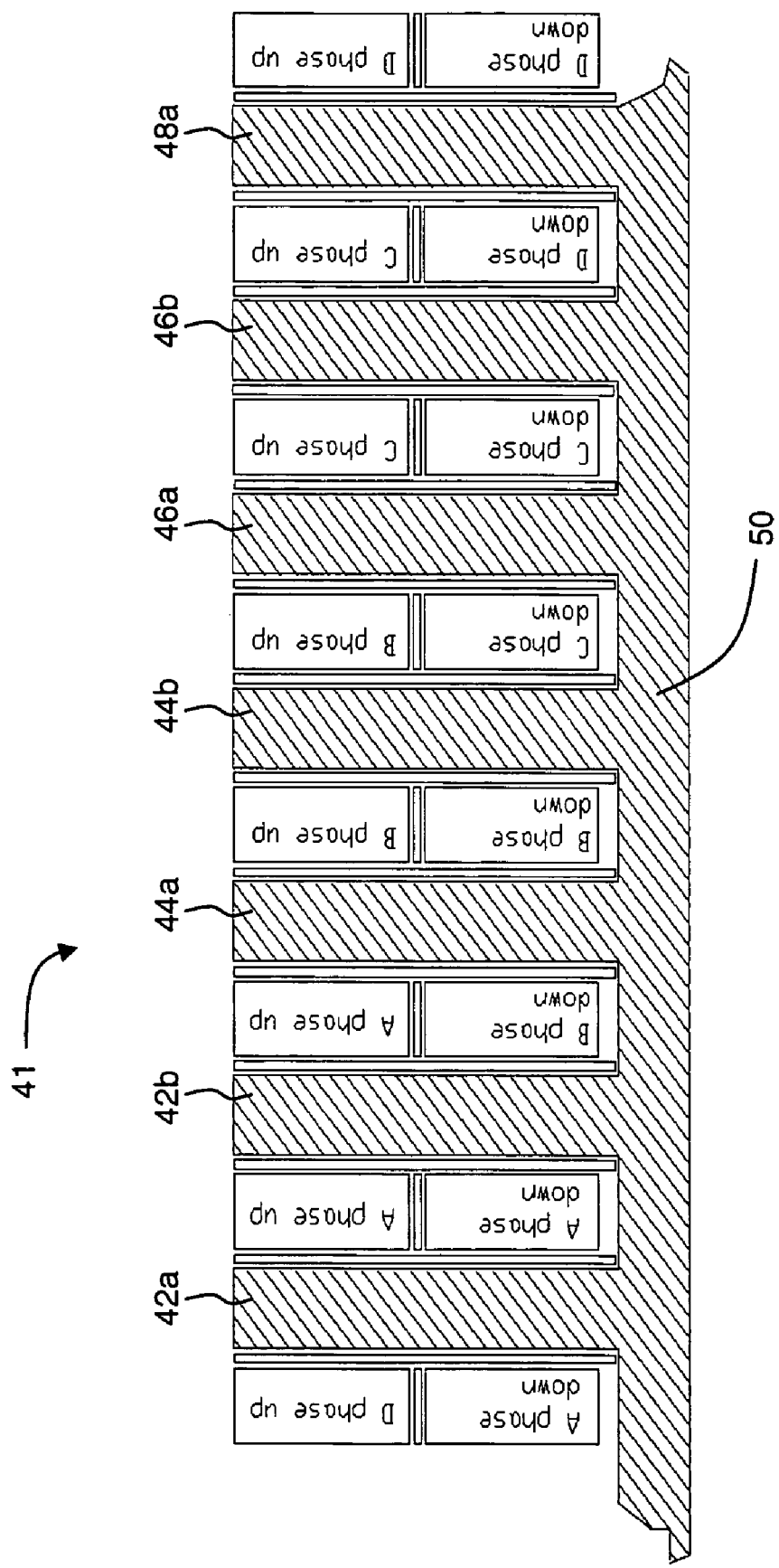
FIG. 12 is a fragmentary, schematic cross-sectional view of a stator structure employing stacked coil windings useful in an axial airgap implementation of the present alternator.

Other configurations are also suitable for the present alternator. For example, FIG. 12 depicts a stator with 16 slots and teeth extending radially inward from a backiron. Such a stator is typically formed by laminating in registry a plurality of thin laminations of suitable magnetic material. The stator may be wound with the foregoing adjacent tooth winding arrangement and used with a suitably configured 12 magnet rotor to produce a four-phase, radial airgap alternator. Radial flux embodiments of the present alternator may be constructed with other numbers of slots and phases as well. Preferably, the number of phases is at least three.

Slot Per Phase Per Pole Ratios

The slot per phase per pole (SPP) value of an electric machine is determined by dividing the number of stator slots by the number of phases in the stator winding and the number of DC poles (SPP=slots/phases/poles). In the present description, a pole refers to the non-time-varying magnetic field, also referred to herein as a DC field, which interacts with a changing magnetic field, i.e., one that varies in magnitude and direction with both time and position. In the preferred embodiments, permanent magnets mounted on the rotor provide the DC field, and hence the number of non-time-varying magnetic poles, referred to herein as DC poles. In other embodiments, a DC electromagnet can provide the rotor DC field. The electromagnets of the stator windings provide the changing magnetic field. A slot refers to the spacing between alternating teeth of the stator of the present machine.

Conventional machines are frequently designed to have an SPP ratio of 1 to 3 to obtain acceptable functionality and noise levels and to provide smoother output due to better winding distribution. SPP ratios of 1 or more inherently require distributed turns. However, designs with a fractional SPP value, e.g. 0.5, have been sought to reduce the effect of end turns. End turns are the portions of wire in the stator coils that connect the windings between slots. Although such connection is, of course, required, the end turns do not contribute to the torque and power output of the machine. In this sense they are undesirable, because they increase the amount of wire required and contribute ohmic losses to the machine while providing no benefit. Hence, one goal of the machine designer is to minimize end turns and provide a machine with manageable noise and cogging. On the other hand, the present alternator is implemented with SPP ratio below 1. By operating with high pole and slot count, the noise and cogging can be kept to acceptable levels. These options commonly were not viable in previous machines, because the required increase in commutating frequency is unacceptable without the use of advanced, low loss stator materials.

In different embodiments of the present machine, the SPP ratio is an integral ratio, such as 0.25, 0.33, or 0.5. For example, a four-phase configuration corresponding to FIG. 5 may have 48 slot and 36 poles, resulting in an SPP=0.33. A three-phase embodiment might have 48 slots and 64 poles for an SPP=0.25. Ordinarily, prior art machines with SPP≦0.5 have been operated at low frequencies, such as line frequencies, with a low pole count, resulting in a high, difficult to control cogging. On the other hand, the use of advanced magnetic materials in the present machine permits the commutating frequency to be raised, so that low SPP values can be maintained, while still minimizing cogging and without reducing the machine speed.

In some embodiments, machines having fractional SPP ratios and non-distributed windings beneficially employ modular coils. As used herein, the term "distributed winding" is signifies a stator coil in which the windings encircle a plurality of teeth instead of a single tooth, as described hereinabove. The modular coils optionally used in the present machine can be pre-formed and then slipped over tooth sections that are not tapered. The present machine can also employ windings that are disposed in a stacked configuration, as disclosed in the aforementioned U.S. patent application Ser. No. 10/979,336. However, any winding arrangement known in the art is applicable. The windings may be formed in place around the teeth, or they may be separately prepared as an assembly and slipped over the tooth ends.

High Pole Count, High-Frequency Design Using Low Loss-Materials

The present structure and method are applicable to alternators having a pole count ranging from low to high. However, the benefits of the present adjacent-tooth winding configuration are especially beneficial in HID lamp systems wherein the incorporation of low-loss materials in the stator permits use of high pole count alternators operating at frequencies above typical line frequencies. In turn, the increased frequency operation shortens the time spend near the zero-voltage crossing and thereby mitigates the likelihood of lamp extinguishment. In specific embodiments, the present invention provides an axial airgap electric device with a high pole count that operates with a commutating frequency of at least 200 Hz, and more preferably, a commutating frequency ranging from about 500 Hz to 3 kHz or more. Designers ordinarily have avoided high pole counts for high speed machines, since conventional stator core materials, such as Si—Fe, cannot operate at the proportionately higher frequencies necessitated by the high pole count. In particular, known devices using Si—Fe cannot be switched at magnetic frequencies significantly above 400 Hz due to core losses resulting from changing magnetic flux within the material. Above that limit, core losses cause the material to heat to the point that the device cannot be cooled by any acceptable means. Under certain conditions, the heating of the Si—Fe material may even be severe enough that the machine cannot be cooled whatsoever, and will self-destruct. However, it has been determined that the low-loss characteristics of suitable amorphous, nanocrystalline and optimized Fe-based metals allow much higher switching rates than possible with conventional Si—Fe materials. While, in a preferred embodiment, the choice of amorphous metal alloy, such as METGLAS® 2605SA1 alloy, removes the system limitation due to heating at high frequency operation, the winding configuration and overall machine configuration are also improved to take better advantage of the beneficial properties of the amorphous material.

The ability to use much higher exciting frequencies permits the present machines to be designed with a much wider range of possible pole counts. The number of poles in the present device is a variable based on the permissible machine size (a physical constraint) and on the expected performance range. Subject to allowable excitation frequency limits, the number of poles can be increased until magnetic flux leakage increases to an undesirable value, or performance begins to decrease.

There is also a mechanical limit presented by stator construction on the number of rotor poles, since stator slots must coincide with the rotor magnets. Mechanical and electromagnetic constraints in concert limit the number of slots that can be made in the stator. These effects, in turn, are in part a function of the frame size of the machine. Some boundaries can be set to determine an upper limit on slot number for a given stator frame that provides a proper balance of copper and soft magnetic material. Adjustment of the balance can be used as a parameter in making well performing axial gap machines. The present invention provides machines that optimally have about 4 or 5 times the number of poles typical for current industrial machines of comparable physical size.

In preferred embodiments, the present alternator is adapted to operate with commutating frequencies considerably higher than those typically used in the rotating machine industry. The commutating frequency (CF, in Hz) is the rotating speed multiplied by the number of pole pairs, where the pole pairs is the number of poles divided by two, and the rotating speed is in units of revolutions per second (CF=rpm/60×pole/2). Alternators used in preferred embodiments of the present light tower operate at commutating frequencies of at least about 200 Hz. More preferably, the frequency is at least about 300 Hz, and still more preferably, the commutating frequency ranges from about 500 Hz to about 3 kHz. Such frequencies provide for a very steep waveform near the zero crossing, greatly decreasing the likelihood of HID lamp extinguishment. Operation at these frequencies is beneficial in connection with other uses of the present alternator as well. Pole and slot counts in the preferred alternator may be as large as 96 or more. The machines provided are generally more efficient than typical devices in the industry when operated in the same speed range, and as a result provide greater speed options. The present configuration is particularly attractive for the construction of machines having a very wide range of speed, power, and torque ratings, in a manner that combines high energy efficiency, high power density, ease of assembly, and efficient use of expensive soft and hard magnetic materials.

Thermal Properties and Efficiency

One of the characteristics that limits attainable device output efficiency in all electric machines, including both those using conventional Si—Fe alloys and those using improved, low core loss soft magnetic materials, is the loss of energy to waste heat. This waste heat comes from a number of sources, but predominantly from ohmic losses, skin and proximity effect losses in the windings, rotor losses from eddy currents in magnets and other rotor components, and core loss from the stator core. The "continuous power limit" of conventional machines is often determined by the maximum speed at which the machine can operate continuously while still dissipating enough of the waste heat to prevent an unacceptable temperature rise. The continuous power limit is a function of the current.

In the high frequency, high pole count electric devices optimally applicable in the practice of the present invention, less waste heat is generated because amorphous, nanocrystalline, and optimized Fe-based metal alloy have lower losses than conventional Si—Fe. The designer can exploit the low loss characteristics of these materials by increasing the frequency, speed and power, and then correctly balancing and "trading" the low core loss versus the ohmic loss. Overall, for the same power as conventional machines, the high frequency, high pole count electric devices optimally applicable in the present invention exhibit lower loss, and hence higher torques and speeds, and can thus achieve higher continuous speed limits than conventional machines.

One advantage of the machine preferred in the practice of an aspect of the present invention is the ability to maximize the device's efficiency while maintaining cost effectiveness. As is conventional, device efficiency is defined as useful power output divided by power input. The high-frequency, high pole count electric devices optimally applicable in the present invention operate simultaneously at higher commutating frequencies with high pole count, resulting in a more efficient device having low core losses and high power density. They exceed the industry standard high frequency limit of 400 Hz, beyond which there have heretofore been few, if any practical applications.

The performance and increased efficiency of the preferred high-frequency, high pole count electric devices applicable to the present invention are not simply inherent features of replacing conventional Si—Fe with amorphous metal. A number of designs with amorphous metal have been proposed, but have met with performance failure (including overheating and lower output power). This failure is believed to have arisen in large measure as a result of merely applying new materials (e.g., amorphous metals) and production methods in manners that were designed for, and suitable to, a conventional material (Si—Fe containing 3.5% or less of Si by weight). The early performance failure, combined with the perceived cost of processing amorphous metal into motors, led the industry to abandon the research efforts.

The presently preferred electric devices overcome the performance failures of the prior art through the design of a rotating electric machine that exploits the beneficial properties of amorphous, nanocrystalline, or optimized Fe-based metal alloy, or grain-oriented or non-grain-oriented Fe-based materials. Also provided are construction methods compatible with the physical and mechanical characteristics of the various improved materials.

The following examples is presented to provide a more complete understanding of the invention. The specific techniques, conditions, materials, proportions and reported data set forth to illustrate the principles and practice of the invention are exemplary and should not be construed as limiting the scope of the invention.

EXAMPLE

An axial airgap stator useful in a four-phase alternator for an HID lighting system is designed with 48 teeth and slots. The stator has an OD of 200 mm, an ID of 120 mm, and a slot depth of 29 mm. The rotor has 36 poles and is formed using sintered NdFeB magnets. The alternator is designed to produce about 1 kW per phase to drive standard metal halide HID lamps, supplying a strike voltage of about 550 Vrms and an operating voltage of about 250 Vrms. A series of stator structures having a range of values of core tooth area "A", average slot pitch "P", slot width "w", rotor side setback "G", and coil axial length (equal to T-G) is considered using finite element analysis software running on a personal computer. Values of the inductance "L" and the inductance constant are calculated, wherein:

$$K_l = \mu \frac{A}{l} \quad (2)$$

$$L = N^2 K_l \quad (3)$$

and $\mu$ is the effective permeability of the magnetic circuit, A the cross-sectional area, and N is the number of windings. $K_l$ is further analyzed in terms of additive contributions from the self-inductance $K_{ls}$ of each circuit and the mutual inductance with the other circuits $K_{lm}$. Using a multivariate regression analysis, the quantities $K_{ls}$ and $K_{lm}$ are found to be given by the following approximate expressions:

$$K_{ls} = \frac{A}{0.00077 + 0.0605 \times P + 0.0779 \times w - 0.0655 \times \left[G + \frac{T-G}{2}\right]} \quad (4)$$

$$K_{lm} = \frac{A}{0.0018 + 0.141 \times P + 0.282 \times w - 0.197 \times \left[G + \frac{T-G}{2}\right]} \quad (5)$$

wherein $K_{ls}$ and $K_{lm}$ are expressed in $\mu$H/turn$^2$ and the linear dimensions P, w, G, and T are expressed in m. The total inductance constant $K_l$ is given by the sum of $K_{lm}$ and $K_{ls}$.

The alternator operation is governed by the following approximate equation:

$$V = [(K_e \cdot N \cdot f)^2 - (2\pi \cdot f \cdot I \cdot K_l \cdot N^2)^2]^{1/2} \quad (6)$$

wherein the back emf constant $K_e$ is given by the equation:

$$K_e = \sqrt{2} \pi \cdot N_c \cdot A \cdot B_{pk} \cos(22.5°) \quad (7)$$

$$V = [(K_e \cdot N \cdot f)^2 - (2\pi \cdot f \cdot I \cdot K_l \cdot N_c \cdot N^2)^2]^{1/2} \quad (8)$$

and $N_c$ is the number of coils connected in series per phase (12 in the exemplary configuration) and $B_{pk}$ is the peak flux density (0.93 T for the exemplary design). The factor cos(22.5°) reflects the 45 electrical degree phase angle between the coils of adjacent teeth connected in series-opposition.

The design of the alternator is chosen to satisfy as best as possible the following constraints:
No-load voltage=$K_e \cdot N \cdot f$=550 Vrms
Load voltage V=250 Vrms
Load current I=4 Arms.

One suitable choice of dimensions satisfying these approximate constraints is provided by P=10.5 mm, w=5 mm, G=3.3 mm, T=29.3, and N=66. Such a design beneficially allows a light tower system incorporating four metal halide HID lamps rated at 1 kW each to start up and operate reliably.

For test purposes, the alternator is directly driven by either a variable speed electric motor or a diesel engine. The system permits the four lamps to start reliably with a shaft speed as low as about 2500 rpm, corresponding to a commutating frequency of about 750 Hz. After reliably starting, continuous operation can be maintained at a shaft speed of about 1000 rpm or higher.

Having thus described the invention in rather full detail, it will be understood that such detail need not be strictly adhered to, but that various changes and modifications may suggest themselves to one skilled in the art. For example, although axial gap electric machines have been generally described herein, radial gap machines may also be designed according to the principles disclosed herein. Furthermore, the present alternator could also be of another type, such as an induction machine, a synchronous machine, a synchronous reluctance machine, a switched reluctance machine, and a DC electromagnet machine. It is accordingly intended that such modifications be encompassed by the scope of the invention, as defined by the subjoined claims.

What is claimed is:

1. A high intensity lighting system, comprising a plurality of high intensity discharge lamps electrically connected to a polyphase alternator and a prime mover mechanically connected to said alternator, wherein said alternator comprises:

(a) at least one stator assembly comprising: a stator core comprising a plurality of tooth sections extending from a backiron section; and a plurality of stator phase windings, each phase winding comprising a plurality of connected coils, each coil encircling one of said tooth sections;

(b) at least one rotor assembly supported for rotation about an axis and including a plurality of poles, said rotor assembly being arranged and disposed for magnetic interaction with said at least one stator assembly; and (c) wherein said tooth sections of said stator core consist of pairs of circumferentially adjacent teeth, an equal number of said pairs being associated with each of said phases of said alternator, and said coils encircling said respective teeth of each pair being wound in opposite sense and connected in series.

2. A lighting system as recited by claim 1, wherein said alternator is an axial airgap machine.

3. A lighting system as recited by claim 1, wherein said alternator comprises one stator assembly and one rotor assembly.

4. A lighting system as recited by claim 1, wherein said stator core comprises low core loss magnetic material comprising laminated layers composed of at least one material selected from the group consisting of amorphous metal, nanocrystalline metal, and optimized Fe-based ahoy.

5. The lighting system of claim 4, wherein said laminated layers are composed of amorphous metal.

6. The lighting system of claim 1, wherein said stator core comprises low core loss magnetic material having a core loss less than "L" when operated at an excitation frequency "f" to a peak induction level "$B_{max}$" wherein L is given by the formula $L = 12 \cdot f \cdot B^{1.5} + 30 \cdot f^{2.3} \cdot B^{2.3}$, the core loss, excitation frequency and peak induction level being measured in watts per kilogram, kilohertz, and teslas, respectively.

7. The lighting system of claim 1, wherein said alternator is adapted to run with a commutating frequency of at least about 200 Hz.

8. The lighting system of claim 7, wherein said commutating frequency ranges from about 500 Hz to 3 kHz.

9. The lighting system of claim 1, wherein said rotor assembly comprises a plurality of rotor permanent magnets.

10. The lighting system of claim 9, wherein said magnets are composed of a rare earth-transition metal alloy.

11. The lighting system of claim 10, wherein said magnets are SmCo or FeNdB magnets.

12. The lighting system of claim 1, wherein said prime mover comprises an electrical motor.

13. The lighting system of claim 1, wherein said prime mover comprises an internal combustion engine.

14. The lighting system of claim 1, wherein said prime mover comprises an internal combustion engine also used for propulsion of a vehicle.

15. The lighting system of claim 1, wherein each of said tooth sections terminates in a free end opposite said backiron section, and said coil is disposed over a portion of that tooth section to a point of separation from said free end, the separation being sufficient to provide said alternator with a preselected inductance.

16. A high intensity lighting system, comprising a plurality of high intensity discharge lamps electrically connected to a polyphase alternator and a prime mover mechanically connected to said alternator, Wherein said alternator comprises:
(a) at least one stator assembly comprising: a stator core comprising a plurality of tooth sections extending from a backiron section; and a plurality of stator phase windings, each winding comprising a plurality of connected coils, each coil encircling one of said tooth sections, and said tooth sections of said stator core consisting of pairs of circumferentially adjacent teeth, an equal number of said pairs being associated with each of said phases of said alternator, and said coils encircling said respective teeth of each pair being wound in opposite sense and connected in series;
(b) at least one rotor assembly supported for rotation about an axis and including a plurality of poles, said rotor assembly being arranged and disposed for magnetic interaction with said at least one stator assembly; and
(c) wherein said alternator has an inherent impedance characteristic for limiting the current to said lamps and for maintaining lamp operation without any separate impedance.

17. The lighting system of claim 16, wherein said lamps are high intensity discharge lamps requiring a sustaining voltage for maintaining of current between a pair of spaced electrodes for generating output light, and said windings have an alternating current voltage output in each phase having a sustaining voltage substantially at the zero crossover of current sufficient to maintain full lamp-on operation.

18. The lighting system of claim 16, wherein said lamps are high intensity discharge lamps requiring a sustaining voltage for maintaining of current between a pair of spaced electrodes for generating output light, and said windings have an alternating current sustaining voltage output in each phase including a relatively steep voltage change substantially at the zero crossover of current sufficient to maintain full lamp-on operation.

19. The lighting system of claim 16, wherein said inherent impedance characteristic for limiting of the current creates a strike voltage in each phase to initiate turn-on of said lamps and thereafter a sustaining voltage sufficient to maintain operation of said lamps.

20. The lighting system of claim 16, wherein each of the phases of said alternator has a magnetic circuit, and each of said magnetic circuits is substantially free of inter-phase magnetic interaction with the others of said magnetic circuits during operation of said lamps.

21. The lighting system of claim 16, wherein each of said tooth sections terminates in a free end opposite said backiron section, and said coil is disposed over a portion of that tooth section to a point of separation from said free end, the separation being sufficient to provide said alternator with a preselected inductance.

22. The lighting system of claim 16, wherein said stator core comprises low core loss magnetic material comprising laminated layers composed of at least one material selected from the group consisting of amorphous metal, nanocrystalline metal, and optimized Fe-based alloy.

23. The lighting system of claim 22, wherein said laminated layers are composed of amorphous metal.

24. A high intensity lighting system, comprising a plurality of high intensity discharge lamps electrically connected to a polyphase alternator and a prime mover mechanically connected to said alternator, wherein said alternator comprises:
(a) at least one stator assembly comprising: a stator core comprising a plurality of tooth sections extending from a backiron section: and a plurality of stator phase windings, each winding comprising a plurality of connected coils, each coil encircling one of said tooth sections, and wherein said stator core comprises low core loss magnetic material having a core loss less than "L" when operated at an excitation frequency "f" to a peak induction level "$B_{max}$" wherein L is given by the formula $L=12 \cdot f \cdot B^{1.5}+30 \cdot f^{2.3} \cdot B^{2.3}$, the core loss, excitation frequency and peak induction level being measured in watts per kilogram, kilohertz, and teslas, respectively;
(b) at least one rotor assembly supported for rotation about an axis and including a plurality of poles, said rotor assembly being arranged and disposed for magnetic interaction with said at least one stator assembly; and
(c) wherein said alternator has an inherent impedance characteristic for limiting the current to said lamps and for maintaining lamp operation without any separate impedance.

25. A lighting system as recited by claim 16, wherein said alternator is an axial airgap machine.

26. A lighting system as recited by claim 16, wherein said alternator comprises one stator assembly and one rotor assembly.

27. A lighting system as recited by claim 16, wherein said stator core comprises low core loss magnetic material comprising laminated layers composed of at least one material selected from the group consisting of amorphous metal, nanocrystalline metal, and optimized Fe-based alloy.

28. A lighting system as recited by claim 27, wherein said laminated layers are composed of amorphous metal.

29. A lighting system as recited by claim 16, wherein said stator core comprises low core loss magnetic material having a core loss less than "L" when operated at an excitation frequency "f" to a peak induction level "B" wherein L is given by the formula $L=12 \cdot f \cdot B^{1.5}+30 \cdot f^{2.3} \cdot B^{2.3}$, the core loss, excitation frequency and peak induction level being measured in watts per kilogram, kilohertz, and teslas, respectively.

30. A lighting system as recited by claim 16, wherein said alternator is adapted to run with a commutating frequency of at least about 200 Hz.

31. A lighting system as recited by claim 30, wherein said commutating frequency ranges from about 500 Hz to 3 kHz.

32. A lighting system as recited by claim 16, wherein said rotor assembly comprises a plurality of rotor permanent magnets composed of a rare earth-transition metal alloy.

33. A lighting system as recited by claim 16, wherein said prime mover comprises an electrical motor.

34. A lighting system as recited by claim 16, wherein said prime mover comprises an internal combustion engine.

35. A lighting system as recited by claim 16, wherein said prime mover comprises an internal combustion engine also used for propulsion of a vehicle.

36. A lighting system as recited by claim 1, wherein said lamps are high intensity discharge lamps requiring a sustaining voltage for maintaining of current between a pair of spaced electrodes for generating output light, and said windings have an alternating current voltage output in each phase having a sustaining voltage substantially at the zero crossover of current sufficient to maintain full lamp-on operation.

37. A lighting system as recited by claim 1, wherein said lamps are high intensity discharge lamps requiring a sustaining voltage for maintaining of current between a pair of spaced electrodes for generating output light, and said windings have an alternating current sustaining voltage output in each phase including a relatively steep voltage change substantially at the zero crossover of current sufficient to maintain full lamp-on operation.

38. A lighting system as recited by claim 1, wherein each of the phases of said alternator has a magnetic circuit, and each of said magnetic circuits is substantially free of interphase magnetic interaction with the others of said magnetic circuits during operation of said lamps.

* * * * *